United States Patent
Park et al.

(10) Patent No.: US 12,411,885 B1
(45) Date of Patent: Sep. 9, 2025

(54) OPTIMIZING STORAGE OF IMAGES AT AN ELECTRONIC DEVICE BY MONITORING AVAILABLE STORAGE AND PROVIDING FOR MULTIPLE IMAGE-MANAGEMENT MODES, AND SYSTEMS AND METHODS OF USE THEREOF

(71) Applicant: Meta Platforms Technologies, LLC, Menlo Park, CA (US)

(72) Inventors: Juliana Park, Emerald Hills, CA (US); Mengnan Shen, Redwood City, CA (US); Sarjan Shrestha, Hayward, CA (US); Liang Xu, Mountain View, CA (US); Matthew Adam Carney, Lincoln, CA (US); Hamid Aghdaee, Berkeley, CA (US); Sanjiban Kundu, Malden, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 239 days.

(21) Appl. No.: 18/190,855

(22) Filed: Mar. 27, 2023

Related U.S. Application Data

(60) Provisional application No. 63/356,465, filed on Jun. 28, 2022.

(51) Int. Cl.
  *G06F 16/51* (2019.01)
  *G06F 3/01* (2006.01)
  (Continued)

(52) U.S. Cl.
  CPC .............. *G06F 16/51* (2019.01); *G06F 3/011* (2013.01); *G06F 3/04842* (2013.01);
  (Continued)

(58) Field of Classification Search
  CPC ...... G06F 16/51; G06F 3/011; G06F 3/04842; G06F 11/1458; G06F 2201/84; G06T 11/00
  See application file for complete search history.

(56) References Cited

U.S. PATENT DOCUMENTS 7,933,936 B2 * 4/2011 Aggarwal ............. G06F 16/128
  707/812
9,747,057 B1 * 8/2017 Ramani ................... G06F 3/067
  (Continued)

OTHER PUBLICATIONS

Android Enthusiasts (https://android.stackexchange.com/questions/84254/i-cannot-take-pictures-because-my-phone-says-your-internal-storage-is-running-o; Oct. 7, 2014.) (Year: 2014).*

*Primary Examiner* — Yu Chen
(74) *Attorney, Agent, or Firm* — Morgan, Lewis & Bockius LLP

(57) ABSTRACT

A method for optimizing storage of images at a wearable device includes obtaining information about an amount of storage remaining at the wearable device. Upon determining the amount of storage at the wearable device is less than a first of multiple storage-depletion thresholds, the method provides the user an indication that a first image-management mode is available. In the first image-management mode, the method deletes images that are not of a predetermined image type. Then, upon a determination that the amount of storage at the wearable device is less than or equal to a second of multiple storage-depletion thresholds, the method automatically causes the wearable device to operate in a second image-management mode. While in the second image-management mode, the method blocks a user from storing additional images until the method determines that the amount of storage remaining at the wearable device is above the second storage-depletion threshold.

20 Claims, 17 Drawing Sheets

(51) Int. Cl.
*G06F 3/04842* (2022.01)
*G06F 11/14* (2006.01)
*G06T 11/00* (2006.01)

(52) U.S. Cl.
CPC .......... *G06F 11/1458* (2013.01); *G06T 11/00* (2013.01); *G06F 2201/84* (2013.01)

(56) References Cited

U.S. PATENT DOCUMENTS

| | | | |
|---|---|---|---|
| 10,545,653 B2* | 1/2020 | Dye | H04N 21/2385 |
| 2014/0226909 A1* | 8/2014 | Montalvo | G11B 27/105 |
| | | | 382/224 |
| 2016/0283366 A1* | 9/2016 | Nguyen Tien | G06F 12/0246 |
| 2017/0046340 A1* | 2/2017 | Bhide | G06F 16/583 |
| 2017/0357465 A1* | 12/2017 | Dzeryn | G06F 3/0647 |
| 2018/0196587 A1* | 7/2018 | Bialynicka-Birula | |
| | | | G06V 20/41 |
| 2018/0364557 A1* | 12/2018 | Park | H04N 23/651 |
| 2021/0142438 A1* | 5/2021 | Appu | G06F 9/3818 |
| 2022/0309700 A1* | 9/2022 | Ito | H04N 23/45 |

* cited by examiner

500

502 In accordance with a first determination that a first amount of storage is less than or equal to a first storage-depletion threshold:

Providing an indication, at a wrist-wearable device, that a first image-management mode is available, wherein, when the wrist-wearable device is operating in the first image-management mode, the wrist-wearable device is caused to delete one or more images that are not of a predetermined image type.

504 In accordance with an intermediate determination that an intermediate amount of storage at the wrist-wearable device is less than or equal to an intermediate storage-depletion threshold, the intermediate storage-depletion threshold between the first storage-depletion threshold and the second storage-depletion threshold:

Providing a new indication, at the wrist-wearable device, distinct from the indication provided in accordance with the first determination, that the first image-management mode is available.

506 While the wrist-wearable device is operating in the first image-management mode:

Deleting one or more deletion-candidate images from the wrist-wearable device that are not of the predetermined protected image type until enough deletion-candidate images have been deleted such that a post-deletion amount of storage remaining at the wrist-wearable device is greater than the first storage-depletion threshold.

508 In accordance with a second determination that an updated amount of storage at the wrist-wearable device is less than or equal to a second storage-depletion threshold, the second storage-depletion threshold associated with a smaller amount of storage than the first depletion threshold:

Automatically, and without a request from a user of the wrist-wearable device, operate the wrist-wearable device in a second image-management mode.

510 When the wrist-wearable device is operating in the second image-management mode, block the user from storing any additional images at the wrist-wearable device until a repletion determination is made that a respective amount of storage remaining at the wrist-wearable device is greater than or equal to the second storage-depletion threshold.

Figure 5

OPTIMIZING STORAGE OF IMAGES AT AN ELECTRONIC DEVICE BY MONITORING AVAILABLE STORAGE AND PROVIDING FOR MULTIPLE IMAGE-MANAGEMENT MODES, AND SYSTEMS AND METHODS OF USE THEREOF

CROSS-REFERENCE TO RELATED APPLICATIONS

This application claims priority to U.S. Prov. App. No. 63/356,465, filed on Jun. 28, 2022, and entitled "Optimizing Storage of Images at an Electronic Device by Monitoring Available Storage and Providing for Multiple Image-Management Modes, and Systems and Methods of Use Thereof," which is incorporated herein by reference.

TECHNICAL FIELD

The present disclosure relates generally to memory management for electronic devices, including but not limited to, optimizing storage of images captured or otherwise received by wearable devices (e.g., wearable devices such as smartwatches) by monitoring whether an amount of storage at a respective wearable device has been depleted beyond storage-depletion thresholds, which correspond to respective amounts of available storage at the wearable device, and then suggesting and then mandating (as different storage-depletion thresholds are satisfied) that the wearable device operate in specific image-management modes.

BACKGROUND

Many electronic devices are designed for a particular subset of general computing functionality and/or use cases. Smaller, specialized computing devices, especially devices intended to be worn by users (e.g., which can be referred to as wearable devices), are generally more resource-constrained than standalone computers or laptops, because there is not as much space to house computing components, such as processors and memory, without causing the device to be overly obtrusive or cumbersome to wear for daily activities, thereby limiting the user's enjoyment of the electronic device's capabilities, including portability.

As one example, images captured and/or received by an electronic device can require a large amount of memory (as compared to other stored data such as textual messages and other data that occupies a lesser amount of storage), since such images generally comprise a multitude of individual pixels with information about the pixels and the overall image (e.g., coded data related to the color and/or additional features of each pixel), as well as additional information about the images including image properties, such as available file formats, file descriptions, etc. As such, there is a need for electronic devices, including wearable devices, that can proactively manage memory issues, particularly for smaller, wearable devices that may have constrained resources and especially for certain types of stored data, such as data about digital images.

SUMMARY

To avoid one or more of the drawbacks or challenges discussed above, the electronic devices (e.g., wearable devices) disclosed herein provide users with efficient and intuitive functionality for proactively managing storage (e.g., proactive in the sense that memory issues are identified and surfaced to the user before those issues become more pronounced and then action is taken to avoid negative impacts to functioning of the device before those issues would occur) to avoid running out of memory, and/or causing the electronic devices to operate less effectively as a result of having too little free memory. More specifically, the electronic devices, including wearable devices, provide users with indications that they are crossing various depletion thresholds associated with amounts of available storage. In addition to the indications, the electronic devices can also provide selectable options to users for managing storage to free up or otherwise make available more storage at the respective electronic devices or others. Further, the electronic devices can also perform automatic functions, without intervention from respective users, which cause the devices to free up more space by automatically deleting images that are not of a pre-determined image type (e.g., images that have not been selected as favorites, or otherwise delineated as a predetermined protected image type by the user). These techniques allow for electronic devices, including wearable devices, to be designed such that they are functional, practical, and convenient for day-to-day use, while also allowing users to capture images without worrying that they will unknowingly use too much of the available storage, resulting in at least one of the deleterious consequences described above. While the primary example described herein relates to implementing these techniques at a wearable device (e.g., a smart watch), other wearable and non-wearable devices with cameras can also benefit from these techniques, such as head-wearable devices (smart glasses or VR goggles), smart anklets with cameras, smart ring devices (finger or toe rings), and other wearable devices that can include a camera but have more limited storage and computing resources.

In certain embodiments, the storage-management techniques described herein can be performed by a single electronic device (e.g., a wearable device), or can be performed by the single electronic device in conjunction with other electronic devices (e.g., smart phones, head-wearable devices, portable computing units, etc.) in communication with respective wearable devices. As such, users are able to receive and respond to indications related to storage depletion, including available image storage, at their wearable devices while interacting with other respective electronic devices that have more screen space (or currently-utilized screen space if the user is viewing a display through a head-wearable device and is determined, e.g., via gaze tracking or positioning of the wearable device, to not currently be viewing the display of the wearable device), computing power, and/or storage management applications. In other words, systems employing the techniques discussed herein can include multiple devices operating in tandem to manage resources associated with a group of multiple devices (which can each be associated with, and even worn at one time by one user), and can likewise provide user interfaces (e.g., user interfaces with user-interface elements and selectable affordances (e.g., buttons)) at multiple electronic devices, for the user to control image-management modes at one or more of the multiple electronic devices.

To further some of the ends briefly summarized above, in accordance with some embodiments, a method is performed at a wearable device. The wearable device has one or more processors and memory storing instructions for execution by the one or more processors. The method includes determining a first amount of storage at the wearable device. The method also includes, in accordance with a first determination that the first amount of storage is less than or equal to a first storage-depletion threshold, providing an indication, at the wearable device, that a first image-management mode is available, wherein when the wearable device is operating in the first image-management mode, the wearable device is caused to delete one or more images that are not of a predetermined protected image type. The method also includes, in accordance with a second determination that an updated amount of storage at the wearable device is less than or equal to a second storage-depletion threshold, the second storage-depletion threshold associated with a smaller amount of storage than the first storage-depletion threshold, automatically, and without a request from a user of the wearable device, operating the wearable device in a second image-management mode, wherein when the wearable device is operating in the second image-management mode, the wearable device is configured to block the user from storing any additional images at the wearable device until a repletion determination is made that a respective amount of storage remaining at the wearable device is greater than or equal to the second storage-depletion threshold. Other embodiments include corresponding wearable devices, capsules of wearable devices, and computing systems that include wearable devices and other connected devices, each configured to perform one or more of the operations described herein. One example of this is shown in FIGS. 1A-1K, in which a computing system includes a wearable device and a smart phone device, and the computing system is caused to present indications that a first image-management mode is available at the wearable device as the amount of available storage at the wearable device becomes less than each of a plurality of storage-depletion thresholds and also causes the wearable device to prevent storage of new images when the amount of available storage at the wearable device is less than a critical storage-depletion threshold.

Note that the various embodiments described above can be combined with one or more of the other embodiments described herein. The features and advantages described in the specification are not necessarily all-inclusive and, in particular, many additional features and advantages will be apparent to one of ordinary skill in the art in view of the drawings, the specification, and the claims. Moreover, it should be noted that the language used in the specification has been selected for readability and instructional purposes and may not necessarily have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIG. 5 is a detailed flow diagram illustrating a method for storage management performed by a computing system with at least one electronic device, in accordance with some embodiments.

Figure 1A:
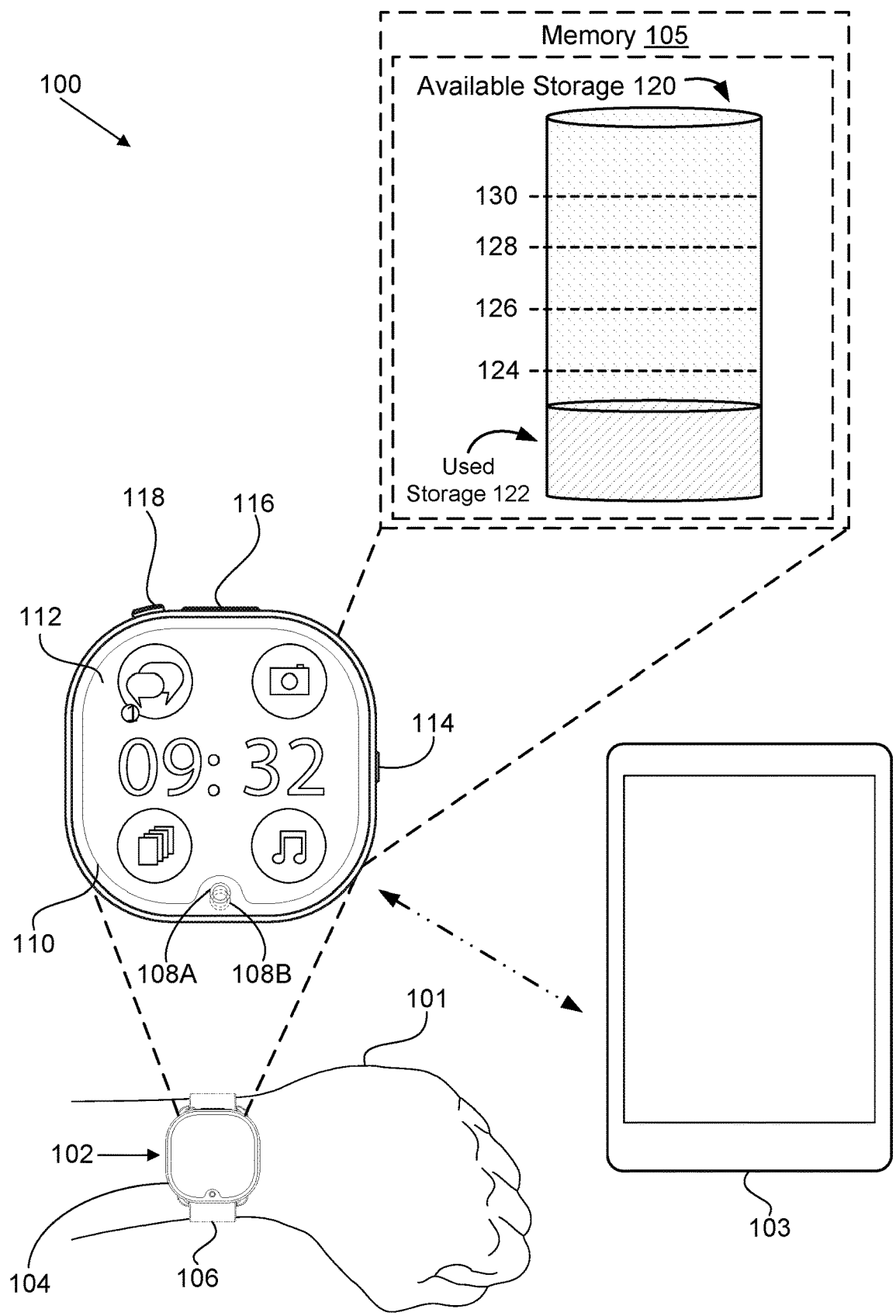
FIGS. 1A-1K depict user interactions with a wearable device that are performed in conjunction with a method for storage management at the wearable device as storage is being depleted, and then made available, at the wearable device, in accordance with some embodiments.

In accordance with common practice, the various features illustrated in the drawings are not drawn to scale. Accordingly, the dimensions of the various features may be arbitrarily expanded or reduced for clarity. In addition, some of the drawings may not depict all of the components of a given system, method, or device. Finally, like reference numerals are used to denote like features throughout the specification and figures.

DETAILED DESCRIPTION

Having thus briefly described the drawings, what follows next is a detailed description of each of the figures/drawings.

For ease of reference, attention will first be directed to an example sequence of events performed at a computing system that includes a wearable device and a smart phone. Example components and their detailed specifications will be referred to throughout the description of the example sequence, and the structures and functionality of the example electronic devices will be described in more detail in later parts of the specification and/or will otherwise be made apparent by the methods, systems, and devices described herein.

Example Sequences and Methods of Operation

FIGS. 1A-1K illustrate an example of a sequence of events performed in conjunction with computing system 100, which includes an example of the wearable device 102. While the example sequence of events is occurring, processors executing instructions stored in memory 105 (e.g., memory 1400 in FIG. 3) cause operations to be performed at the wearable device 102, including techniques for optimizing storage at the wearable device 102.

In some embodiments, the wearable device 102 includes a removable capsule device (e.g., the watch body 104, which can be referred to as a display capsule, which can be removably coupled with a cradle portion (e.g., the cradle portion 1002C in FIG. 3) to a wearable structure that can include the cradle portion and a watch band 106, thereby forming a wearable device) and the watch band 106, that is used for attaching the watch body 104 to a wrist of a user 101. In some embodiments, the wearable device 102 includes one or more components (e.g., hardware, software, and firmware components) described below with reference to FIG. 3, such as a display 1212 that presents interactable user interfaces, one or more image sensors (e.g., an imaging sensor 1104, an EMG sensor 1108, etc.), and one or more cameras (e.g., the front camera 108A, and the rear camera 108B). In some embodiments, one or more components can be disposed within the capsule device (e.g., the watch body 104 and/or the watch band 106). As discussed in more detail with respect to FIG. 4, the components of the wearable device can all be coupled with (or entirely or partially contained within) the watch body 104, the watch band 106 (which can be coupled with a cradle portion 1002C, as was mentioned above), or they can be integrated via a split architecture that includes some components on the watch body 104, some on the cradle portion 1002C, and some components on the watch band 106.

Turning now to the example scenario shown in FIG. 1A, the user 101 is wearing the wearable device 102. There is a home-screen user interface 112 displayed at the display 110 of the wearable device 102. The home-screen user interface 112 can be used to access various applications (e.g., one or more of the applications 1430 in FIG. 3). The wearable device 102, as depicted in the example of FIG. 1A, is being viewed from the wrist of the user 101 and is attached to wrist of the user 101 by the watch band 106.

Additionally, FIG. 1A illustrates a visual depiction of a portion of the memory 105 of the wearable device 102. Specifically, the memory 105 contains an amount of available storage 120 at the wearable device 102. The amount of available storage 120 may be an allocated portion (e.g., allocated to storage of a particular type of data, such as digital images) of the total amount of available storage (e.g., the available image storage 1418 in FIG. 4A) at the wearable device 102. The visual depiction of the memory 105 further shows the amount of used storage 122 with respect to the amount of available storage 120 at the wearable device 102. It also includes symbolic threshold lines indicating thresholds within the amount of available storage 120 used up by used storage 122 (e.g., depleted from the available storage 120) with respect to a plurality of depletion thresholds (the first storage-depletion threshold 124, the second storage-depletion threshold 126, the third storage-depletion threshold 128, and the critical storage-depletion threshold 130). As will be discussed in detail below, when a determination (e.g., an initial determination upon startup of the wearable device or one made based on a time-based (e.g., every 10 seconds to 1 minute) or event-based (e.g., each time a new image is added to the available storage) determination cycle) is made that a remaining amount of available storage 120 at the wearable device 102 that is not used storage 122 is below the first storage-depletion threshold 124, the wearable device 102 operates in a default image-management mode. That is, if used storage 122 crosses (e.g., is greater than) any of the schematically shown storage-depletion thresholds (e.g., the first storage-depletion threshold 124) shown in the upper right corner of FIG. 1A, then that would result in some form of action to alert the user to take some action and alter a current image-management mode and/or to force the device to switch to a different image-management mode, in accordance with some embodiments. In some embodiments, there is no auto-deletion performed at the wearable device 102 by default when the wearable device 102 is in the default image-management mode. In some embodiments, the user 101 can configure settings of the wearable device 102 to cause auto-deletion to be performed to certain images while the wearable device 102 is operating in the default image-management mode. In some embodiments, auto-deletion can only occur at the wearable device 102 when the wearable device 102 is in a charging state. In some embodiments, certain images are subject to auto-deletion regardless of the image-management mode that the wearable device 102 is operating in. For example, the wearable device may have a trash logical directory (e.g., in a filesystem structure of the wearable device) where the user 101 can specify that media files, including images, are trash, and images in the trash directory can be subject to auto-deletion even when the wearable device 102 is not operating in an image-management mode.

In some embodiments, images are not backed up at the wearable device 102, or another electronic device (e.g., the smart phone 103), while the wearable device 102 operates in the default image-management mode. In some embodiments, images are backed up at another electronic device (e.g., the smart phone 103). In some embodiments, the wearable device 102 backs up all images captured at the wearable device 102 to another electronic device (e.g., the smart phone 103) when the wearable device 102 is being charged (e.g., in a charging state), regardless of determinations concerning the available storage 120 and/or the image-management mode that the wearable device 102 is operating in. In some embodiments, images stored at the wearable device 102 are down-sampled after they are backed up to another electronic device (e.g., the smart phone 103). In some embodiments, the images stored at the wearable device 102 are down-sampled on a regular schedule (e.g., at night). In some embodiments, the time when the images stored at the wearable device 102 are down-sampled depends on the usage data associated with the wearable device 102 (e.g., down-sampling can occur on a schedule that is determined based on how often a user uses the wearable device at various points in time, such that lighter usage time periods can be selected as the time periods when down-sampling should occur).

In some embodiments, the determination about the amount of available storage 120 remaining (e.g., an amount of available storage other than the used storage 122) is made by the wearable device 102. In some embodiments, the determination is made, at least in part, by another electronic device (e.g., the smart phone 103).

Figure 1B:
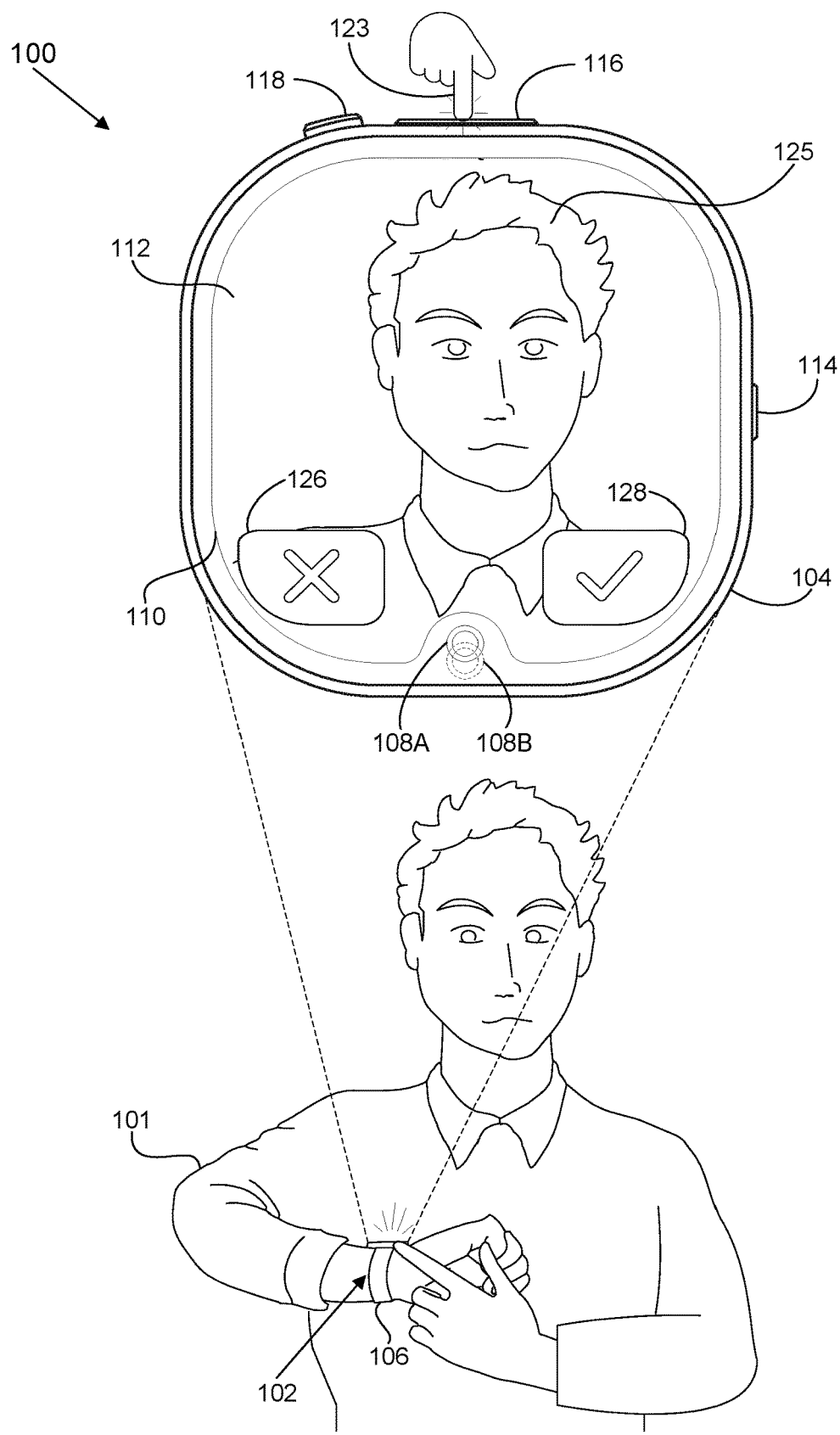

Turning now to FIG. 1B, the user 101 is capturing a new image 125 (e.g., a selfie that includes the user 101 taking a picture of their own face) using one of the cameras (e.g., front camera 108A) of the wearable device 102. The new image 125 of the user 101 is displayed at the display 110 of the wearable device 102 in conjunction with the user 101 confirming that the new image 125 should be captured with the front camera 108A. Confirmation of the capture of the new image 125 can be received based on the user 101 performing a tap gesture 123 on a peripheral button 116 disposed on the watch body 104 of the wearable device 102. In some embodiments, when the user 101 captures the new image 125, the used storage 122 changes as a result of adding the new image 125 to the used storage 122, thereby also reducing the remaining amount of available storage 120. In some embodiments, such a deletion event can trigger a new determination as to an amount of remaining available storage to see if any of the storage-depletion thresholds have been crossed or satisfied. In some embodiments, if the wearable device 102 is operating in an image-management mode besides the default image-management mode, the new image 125 is saved to another electronic device, such as the smart phone 103. In some embodiments, when the user 101 captures the new image 125, the user 101 can also provide another user input to specify that the new image 125 has a predetermined protected image type, which can prevent the new image 125 from being deleted if the wearable device 102 is operating in one of the image-management modes besides the default image-management mode, and/or if the user 101 actively performs operations that cause auto-deletion to be performed. After the tap gesture 123, the display 110 can optionally then display respective selectable affordances (a "cancel" affordance 126, and a "confirm" affordance 128) for allowing the user 101 to confirm that the capture of the new image 125 should proceed.

Figure 1C:
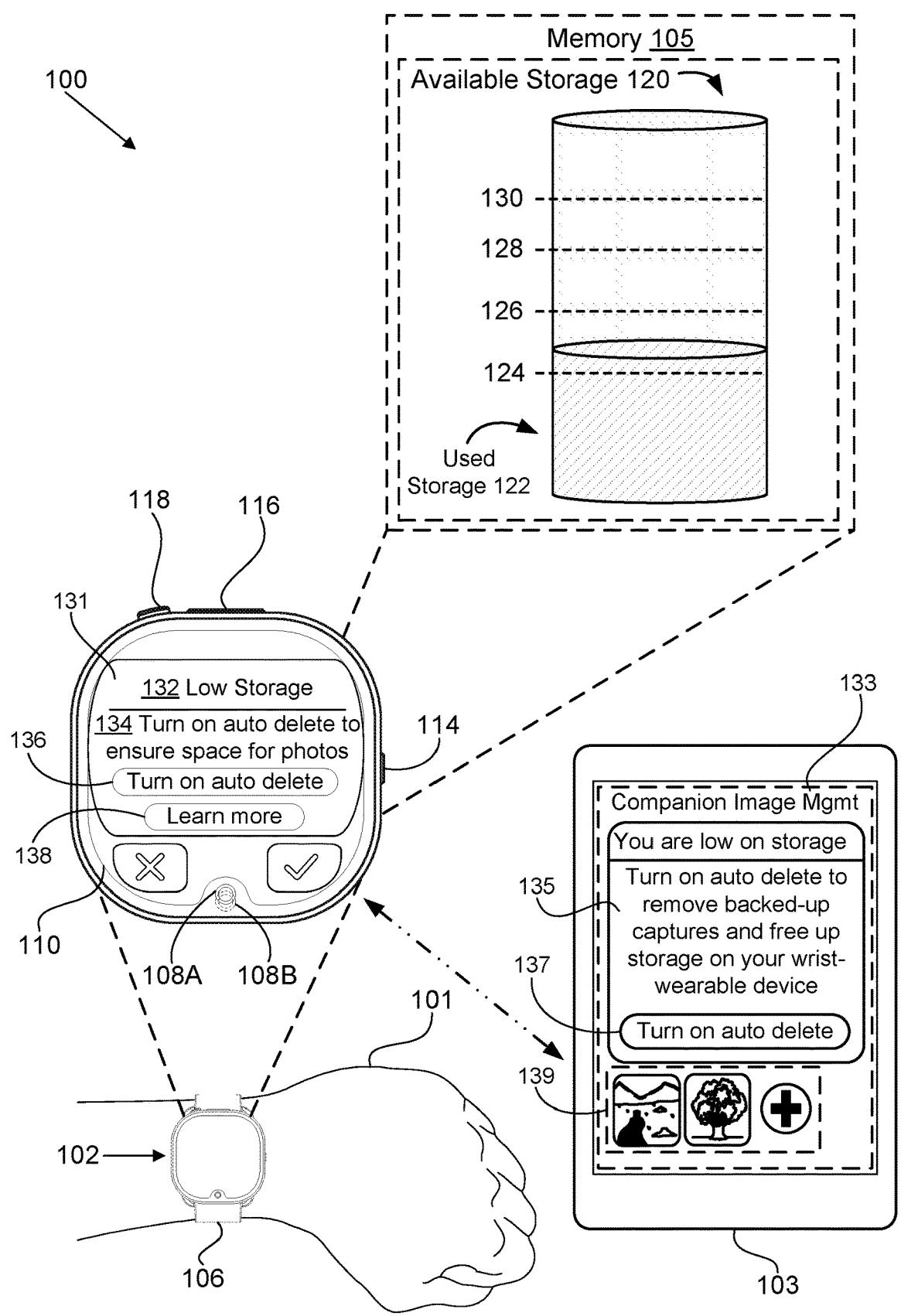

Turning now to FIG. 1C, the wearable device 102 is shown during a state in which it has determined that the remaining amount of available storage 120 is less than the first storage-depletion threshold 124 (e.g., based on the increased amount of used storage 122 caused by the user 101 capturing images like the new image 125 in FIG. 1B). In some embodiments, the first storage-depletion threshold 124 corresponds to the amount of available storage 120 at the wearable device 102 being less than or equal to 515 megabytes (this first storage-depletion threshold can also be defined on a percentage basis, e.g., as a value that is 10% of the allocated storage for images). In some embodiments, the first storage-depletion threshold 124 is based, at least in part, on the average size of an image captured by the user 101 (e.g., five, ten, or fifteen megabytes). In accordance with determining that the remaining amount of available storage 120 is below the first storage-depletion threshold 124, the wearable device 102 is caused to provide an indication that a first image-management mode is available. Specifically, in FIG. 1C, a storage-alert user interface 131 displayed at the display of the wearable device 102, includes a plurality of affordances (also referred to as user interface elements), including an affordance 134 indicating that the user 101 can turn on auto-delete to ensure space for images is made available at the wearable device 102 (e.g., causing the wearable device 102 to operate in the first image-management mode). The storage-alert user interface 131 also includes an affordance 132 providing an explanation to the user 101 as to why the user interface is being displayed, e.g., in the depicted example of FIG. 1C, the affordance 132 indicates that the wearable device 102 has a low amount of available storage 120 (e.g., a textual element that states: "Low Storage"). The storage-alert user interface 131 also includes the affordance 134 described above, indicating that the first image-management mode is available (e.g., a textual element that states: "Turn on auto delete to ensure space for photos"). The storage-alert user interface 131 also includes a selectable affordance 136, which, when selected, displays additional information about the first image-management mode and/or other image-management techniques. The storage-alert user interface 131 also includes a selectable affordance 138 that, when selected, can cause the display 110 of the wearable device 102 to display additional information about image-management options at the wearable device 102.

In some embodiments, the determination that the available storage 120 is less than the first storage-depletion threshold 124 is performed at (and/or the results of the determination are communicated to) another electronic device (e.g., the smart phone 103). In some embodiments, when the determination is made that the available storage 120 is less than the first storage-depletion threshold 124, an additional indication is displayed at another electronic device (e.g., the smart phone 103) that is in communication with the wearable device 102. In some embodiments, the additional indication (e.g., a storage-alert user interface 133, denoted by a dashed box on the display of the smart phone 103) displayed at the smart phone 103 includes additional information (e.g., an affordance 135) notifying the user 101 that the first image-management mode is available at the wearable device 102. As shown in FIG. 1C, the affordance 135 can include information that is not included in the indication (e.g., the storage-alert user interface 131) displayed at the wearable device 102. The storage-alert user interface 133 also includes a selectable affordance 137 for enabling the first image-management mode at the wearable device 102. And the smart phone 103 also includes another user interface element 139 that includes representations of a portion of images associated with a gallery of images stored at the wearable device 102. In some embodiments, the other user interface element 139 includes representations of images captured at more than one electronic device (e.g., the wearable device 102 and the smart phone 103).

Figure 1D:
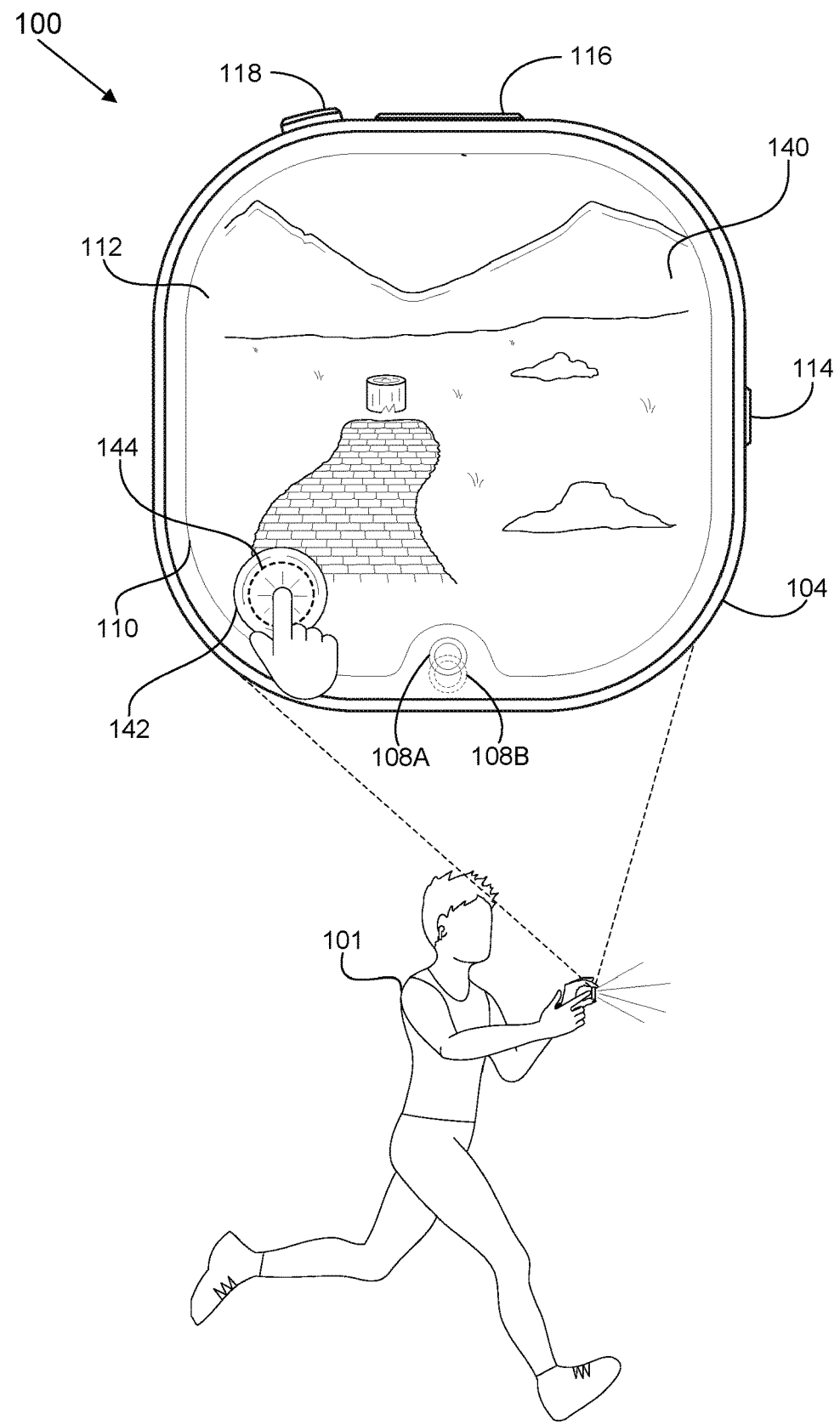

Turning now to FIG. 1D, the user 101 is capturing another image 140 with one of the cameras (e.g., the rear camera 108B) of the wearable device 102. The image 140 is displayed at the display 110 of the watch body 104 of the wearable device 102. In some embodiments, as shown in FIG. 1D, the watch body 104 of the wearable device 102 can be removed from the watch band 106 of the wearable device 102 (e.g., by detaching the watch body 104 from a magnetic and/or pin-based attached to a cradle portion 1002C (FIG. 3, bottom)). The user 101 captures the image 140 by performing a touch gesture 144 directed to an affordance 142 displayed on the display 110 of the wearable device 102. In some embodiments, when the user 101 captures the image 140, the used storage 122 changes as a result of the adding the image 140 to the available storage 120.

Figure 1E:
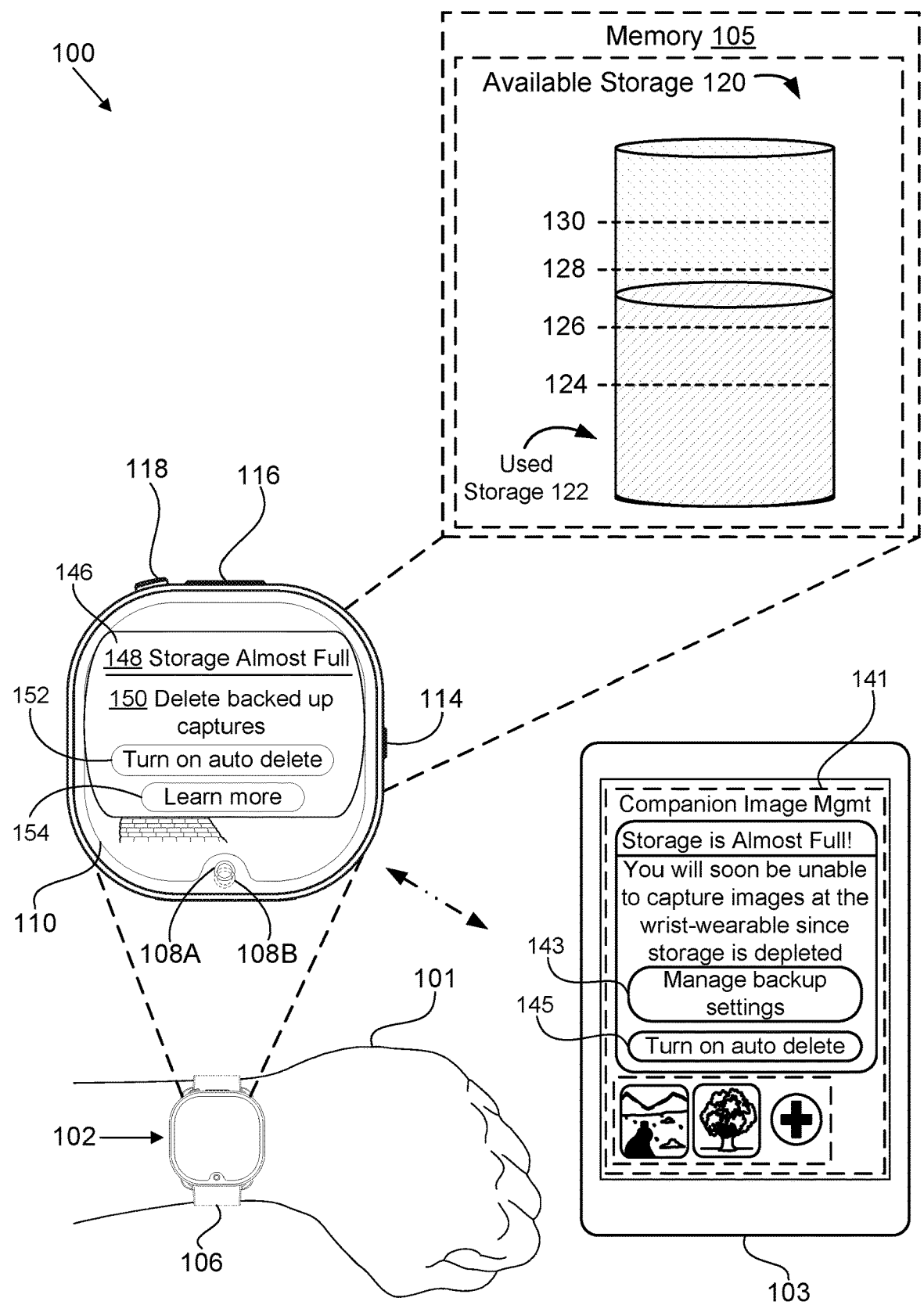

Turning now to FIG. 1E, the wearable device 102 is shown during a state in which it has made a determination that the remaining available storage 120 is less than the second storage-depletion threshold 126, between the first storage-depletion threshold 124 and the critical storage-depletion threshold 130, and providing a new indication (e.g., a user-interface element 146), displayed at the display 110 of the wearable device 102, that the first image-management mode is available. In some embodiments, the second storage-depletion threshold 126 corresponds to an amount of available storage at the wearable device 102 of less than or equal to 250 megabytes. In some embodiments, the second storage-depletion threshold 126 corresponds to any amount of available storage at the wearable device that is between 100 megabytes and 250 megabytes. The user-interface element 146 includes an affordance 150 that includes information about the first image-management mode. As shown in FIG. 1E, the affordance 150 can display different information than is displayed in the storage-alert user interface 131 in FIG. 1C. The user-interface element 146 includes a selectable affordance 152 for enabling the first image-management mode (e.g., a textual element that states: "Turn on auto delete"). The user-interface element 146 includes another selectable affordance 154, that, when selected, displays additional information about the first image-management mode and/or other image-management techniques.

In some embodiments, the determination that the available storage 120 is less than the second storage-depletion threshold 126 is performed at another electronic device (e.g., the smart phone 103). In some embodiments, when the determination is made that the available storage 120 is less than the second storage-depletion threshold 126, an additional indication is displayed at another electronic device (e.g., the smart phone 103) that is in communication with the wearable device 102. In some embodiments, the additional indication (e.g., a user-interface element 141, denoted by a dashed box on the display of the smart phone 103) displayed at the smart phone 103 includes additional information notifying the user 101 that the first image-management mode is available at the wearable device 102. As shown in FIG. 1E, the user-interface element 141 can include information that is not included in the indication (e.g., the user-interface element 146) displayed at the wearable device 102. In some embodiments, the additional information displayed at the smart phone 103 can include one or more affordances identical to those displayed in the storage-alert user interface 133 shown in FIG. 1C. In some embodiments, the additional information displayed in the user-interface element 141 includes distinct affordances from those displayed in the storage-alert user interface 133. The affordance 135 can also include selectable affordances (e.g., a selectable affordance 143, and a selectable affordance 145) that can cause operations to be performed at the wearable device 102 and/or the smart phone 103. For example, the selectable affordance 143 which includes a textual indication that states "Manage backup settings" can be used to identify which images that are captured at the wearable device 102 should be "backed-up" (e.g., replicated, and/or otherwise made available for restoration) to the smart phone 103. In some embodiments, the user-interface element 141 can also include a similar selectable affordance to the one displayed in FIG. 1C for enabling the first image-management mode at the wearable device. In some embodiments, the smart phone 103 also includes another user-interface element that includes a gallery of images stored at the wearable device 102 (e.g., the same or a similar user interface element 139 that was displayed at the smart phone 103 in FIG. 1C).

Figure 1F:
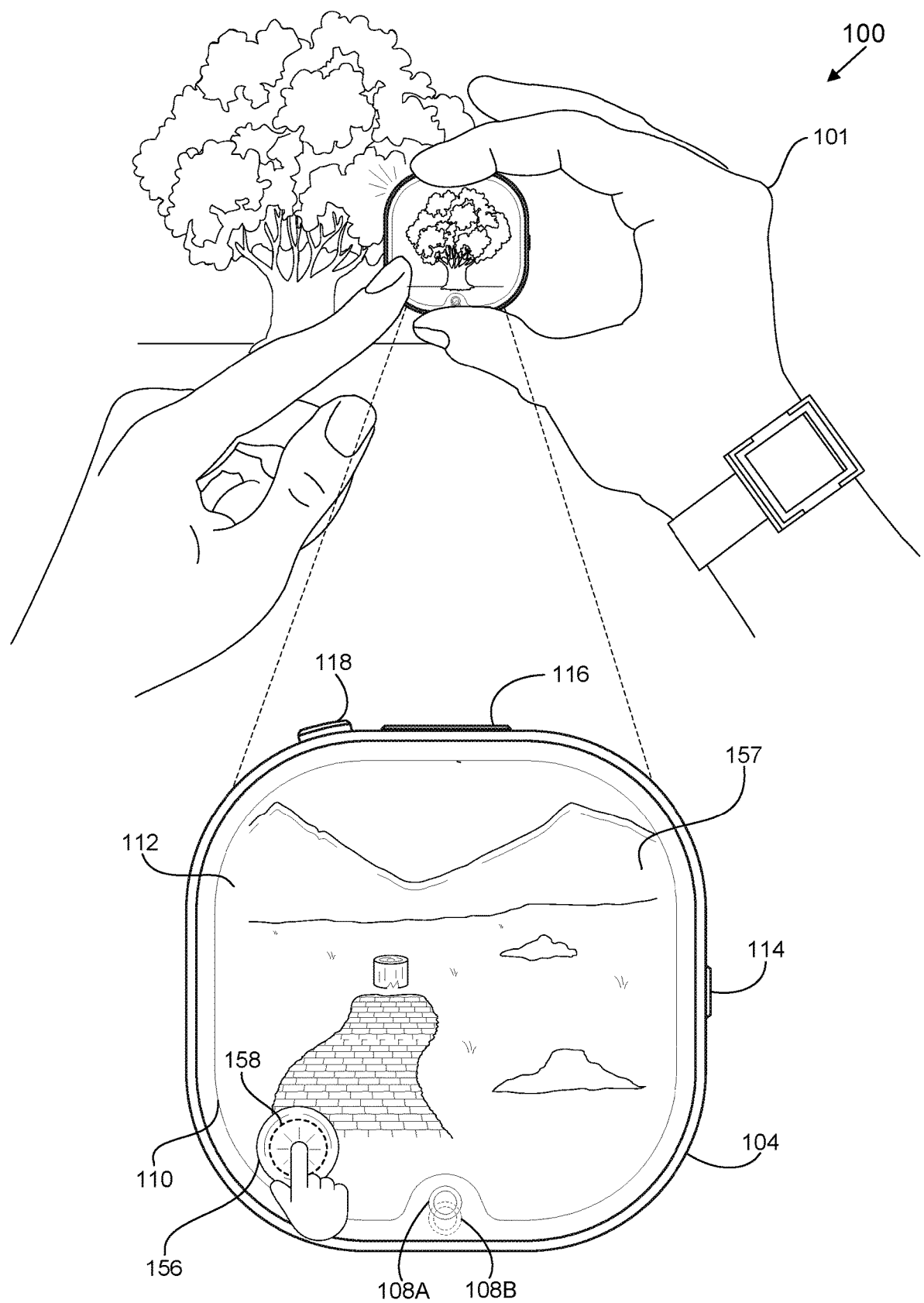

Turning now to FIG. 1F, the user 101 is capturing another image 157 with one of the cameras (e.g., the rear camera 108B) of the wearable device 102. The image 157 is displayed at the display 110 of the watch body 104 of the wearable device 102. In some embodiments, as shown in FIG. 1F, the watch body 104 of the wearable device 102 can be removed from the watch band 106 of the wearable device 102. The user 101 captures the image 157 by performing a touch gesture 158 at an affordance 156 displayed on the display 110 of the wearable device 102. In some embodiments, when the user 101 captures the image 157, the used storage 122 changes as a result of adding the image 157 to the available storage 120.

Figure 1G:
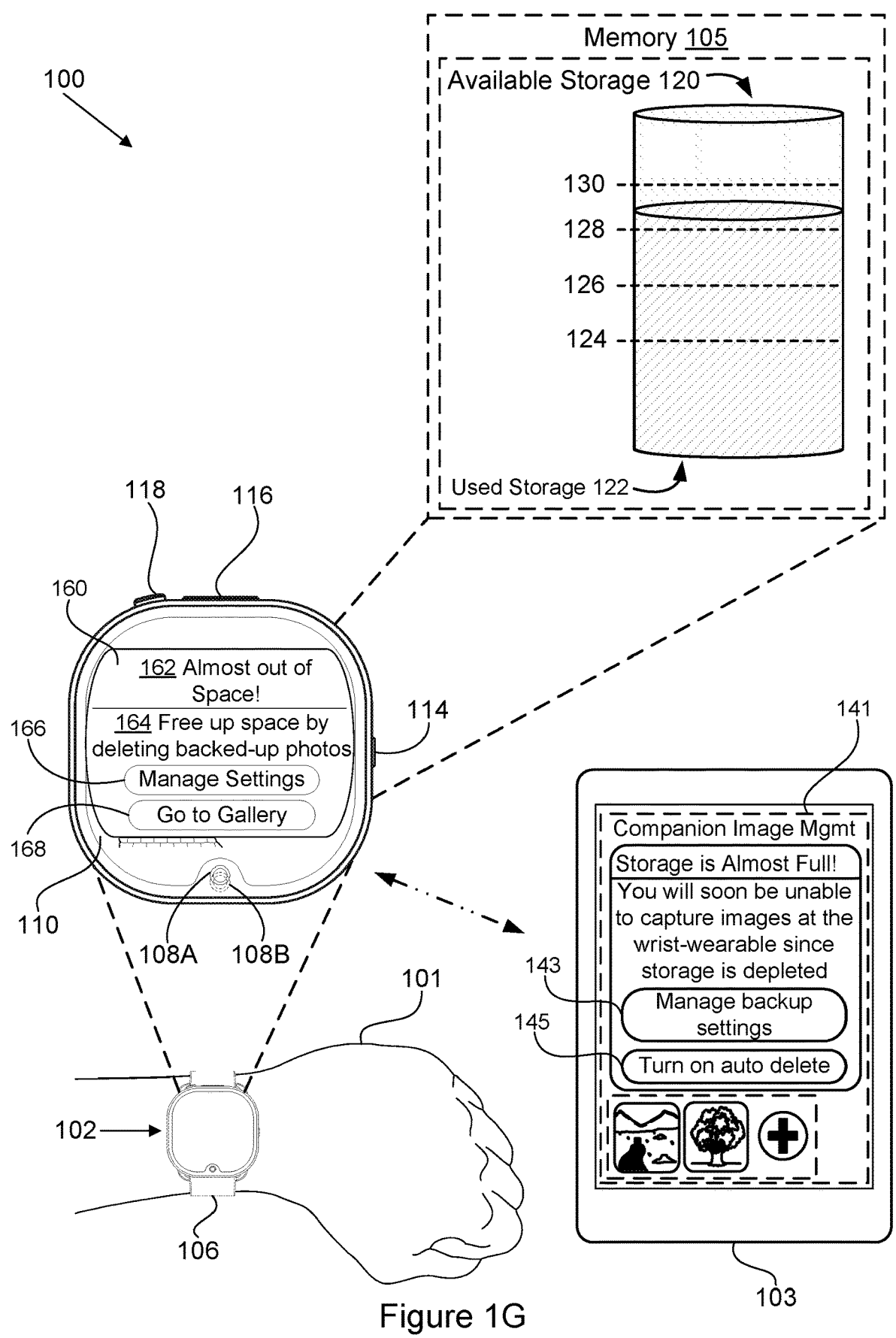

Turning now to FIG. 1G, the wearable device 102 is shown during a state in which the wearable device has determined that the remaining available storage 120 is less than the third storage-depletion threshold 128, corresponding to an amount of storage between the second storage-depletion threshold 126 and the critical storage-depletion threshold 130, and providing a new indication (e.g., user-interface element 160), displayed at the display 110 of the wearable device 102, that the first image-management mode is available. In some embodiments, the third storage-depletion threshold 128 corresponds to an amount of available storage at the wearable device 102 of less than or equal to 75 megabytes. The user-interface element 160 includes an affordance 162 that includes information about the first image-management mode. As shown in FIG. 1G, the affordance 164 can display different information than the affordance 150 that is shown in FIG. 1E and corresponding to the determination that the remaining available storage 120 is less than the second storage-depletion threshold 126. The affordance 164 can also be different than the storage-alert user interface 131 that is shown in FIG. 1C, corresponding to the determination that the remaining available storage 120 is less than the first storage-depletion threshold 124. The user-interface element 160 includes another affordance 166 for managing settings at the wearable device 102. In some embodiments, when the determination is made that the available storage 120 is less than the third storage-depletion threshold 128, an additional indication is displayed at another electronic device (e.g., the smart phone 103) that is in communication with the wearable device 102. As illustrated by the combination of FIGS. 1E and 1F, in some embodiments, the smart phone 103 can display the same user-interface elements and/or selectable affordances for respective determinations that the available storage 120 is less than two or more distinct storage-depletion thresholds, even though the wearable device displays distinct user-interface elements for each of the respective distinct storage-depletion thresholds (e.g., the second storage-depletion threshold 126 and the third storage-depletion threshold 128).

Figure 1H:
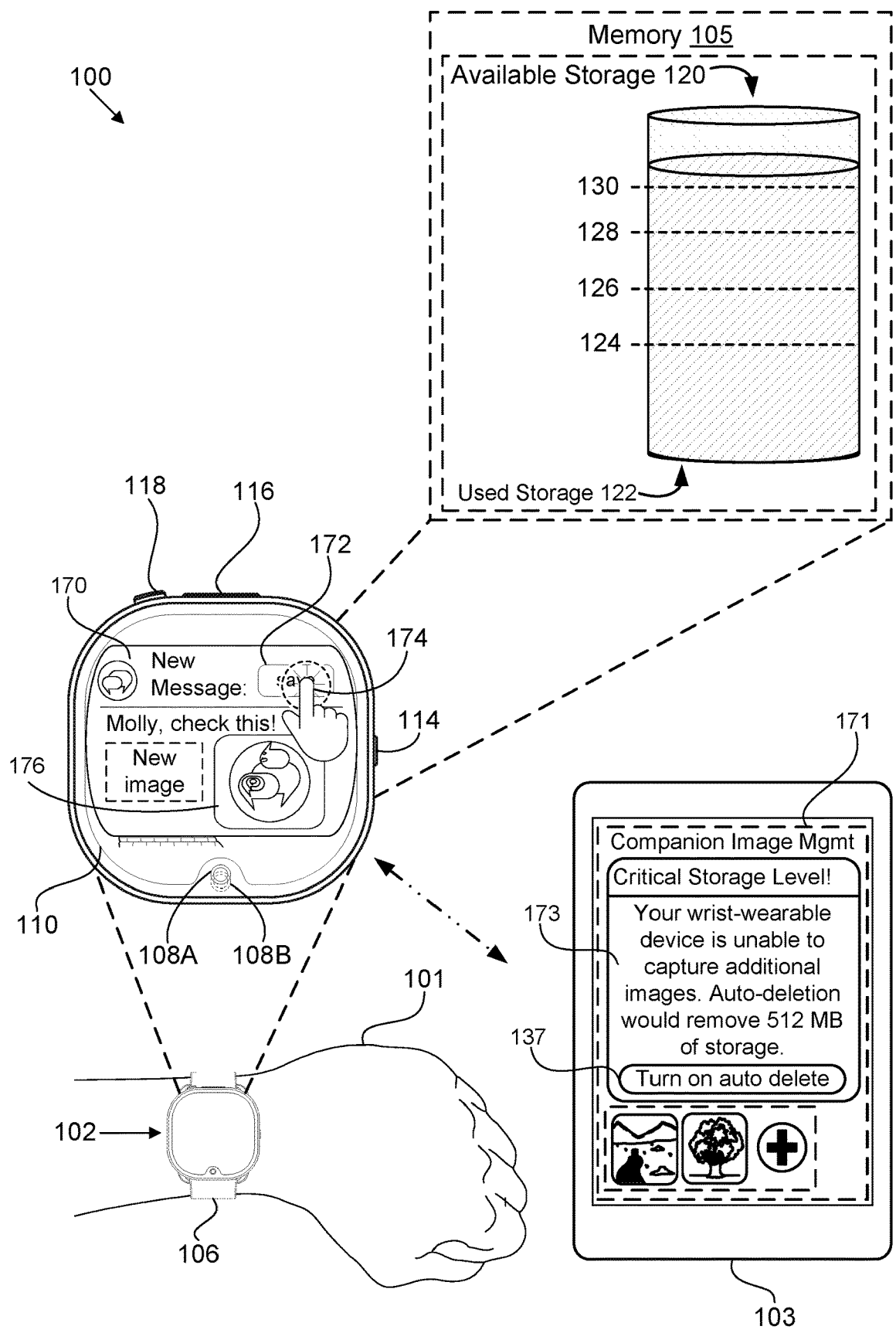

Turning now to FIG. 1H, the user 101 attempts to save an image 176 at the wearable device 102. As shown in FIG. 1H, in addition to new images being captured by cameras of the wearable device 102 (e.g., the front camera 108A or the rear camera 108B), and/or another connected device, images can also be received from other users of different electronic devices. In FIG. 1H, the wearable device 102 is displaying a user-interface element 170 that includes content of an electronic message sent by another user of a different electronic device. The content of the electronic message includes the image 176, and a selectable affordance 172 for saving the image 176 at the wearable device 400. The user 101 is performing a tap gesture 174 directed to the selectable affordance 172 to attempt to save the image 176 at the wearable device 102. In some embodiments, the user 101 can turn on auto-deletion at the wearable device 102 while the wearable device 102 device is operating in the critical image-management mode.

In some embodiments, the determination that the available storage 120 is less than the critical storage-depletion threshold 130 is performed at another electronic device (e.g., the smart phone 103). In some embodiments, when the determination is made that the available storage 120 is less than the critical storage-depletion threshold 130, an additional indication is displayed at another electronic device (e.g., the smart phone 103) that is in communication with the wearable device 102. In some embodiments, the additional indication (e.g., a user-interface element 171, denoted by a dashed box on the display of the smart phone 103) displayed at the smart phone 103 includes additional information notifying the user 101 that the critical image-management mode has been activated at the wearable device 102. As shown in FIG. 1H, the user-interface element 171 can be displayed even though there is no corresponding indication at the wearable device 102 that the critical image-management mode has been activated at the wearable device 102. In some embodiments, the additional information displayed at the smart phone 103 can include one or more affordances identical to those displayed in the storage-alert user interface 133 shown in FIG. 1C (e.g., the selectable affordance 137 indicating that the user 101 can turn on auto-deletion at the wearable device 102. In some embodiments, the additional information displayed in the user-interface element 175 includes distinct affordances from those displayed in the storage-alert user interface 133, or any of the other user-interface elements and/or affordances displayed at the smart phone 103 in FIGS. 1C, 1E, and/or 1G. The user-interface element 171 can include one or more indications, indicating, for example, how the critical image-management mode effects the functionality of the wearable device 102 and/or how much additional storage would be repleted (e.g., "freed up") based on turning on auto-deletion at the wearable device 102 (e.g., the affordance 173 states: "Your wearable device is unable to capture additional images. Auto-deletion would remove 512 MB of storage.").

Figure 1I:
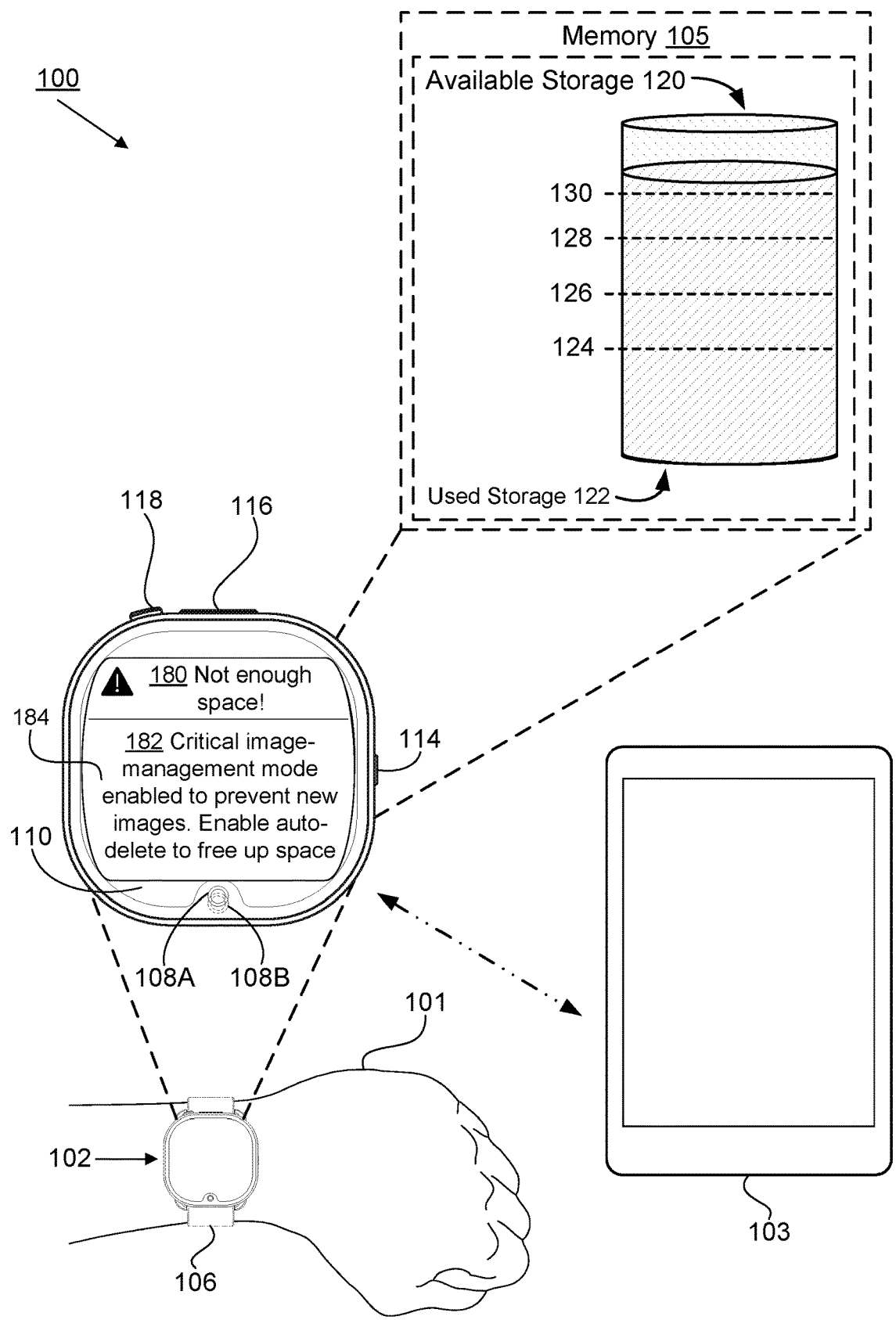

Additionally, in FIGS. 1H-1I, the wearable device 102 is shown during a state in which it has determined that the available storage 120 is less than the critical storage-depletion threshold 130. In some embodiments, the critical storage-depletion threshold 130 corresponds to an amount of available storage at the wearable device 102 of less than or equal to 50 megabytes. In accordance with the determination that the available storage 120 is less than the critical storage-depletion threshold, the wearable device 102 automatically, and without a request from the user 101, operates the wearable device 102 in a second image-management mode. In some embodiments, while the wearable device is operating in the second image-management mode (e.g., the critical image-management mode), the wearable device 102 is configured to block the user 101 from storing any additional images at the wearable device 102 until a determination is made that a respective amount of storage (e.g., available storage 120) remaining at the wearable device 102 is above the critical storage-depletion threshold 130. In some embodiments, the second image-management mode is not the critical image-management mode (e.g., an intermediary image-management mode). While the wearable device 102 is operating in the second image-management mode that is not the critical image-management mode, the wearable device can be configured to require additional user inputs to store additional images and/or other media items at the wearable device 102. For example, when the user 101 attempts to save the image 176 in FIG. 1H, the wearable device 102 can present an additional user interface and or selectable affordance requesting the user 101's permission to override the second image-management mode in order to store the image 176 at the wearable device 102, after the user 101 selects the selectable affordance 172 to save the image 176 at the wearable device 102 (e.g., with the tap gesture 174).

Turning now to FIG. 1I, the wearable device 102 is displaying a user-interface element 184 in response to the user 101 performing the tap gesture 174 directed to the selectable affordance 172 in FIG. 1H. In some embodiments, as shown in FIG. 1I, while the wearable device 102 is operating in the second image-management mode, when the wearable device 102 receives a request to add a new image at the wearable device 102 (e.g., the tap gesture 174 to save the image 176), the wearable device 102 blocks the user 101 from being able to add the new image to the available storage 120. For example, as shown in FIG. 1I, the user-interface element 184 indicates to the user 101 that they cannot save the image 176 to storage at the wearable device 102, since the wearable device 102 is operating in the second image-management mode. The image 176 can be received within a conversation thread of a message application (e.g., the message content included in the user-interface element 170), or the request to add the new image to storage can be made in conjunction with capturing a new image at the wearable device 102, or another electronic device, such as a head-wearable device configured to capture images.

Figure 1J:
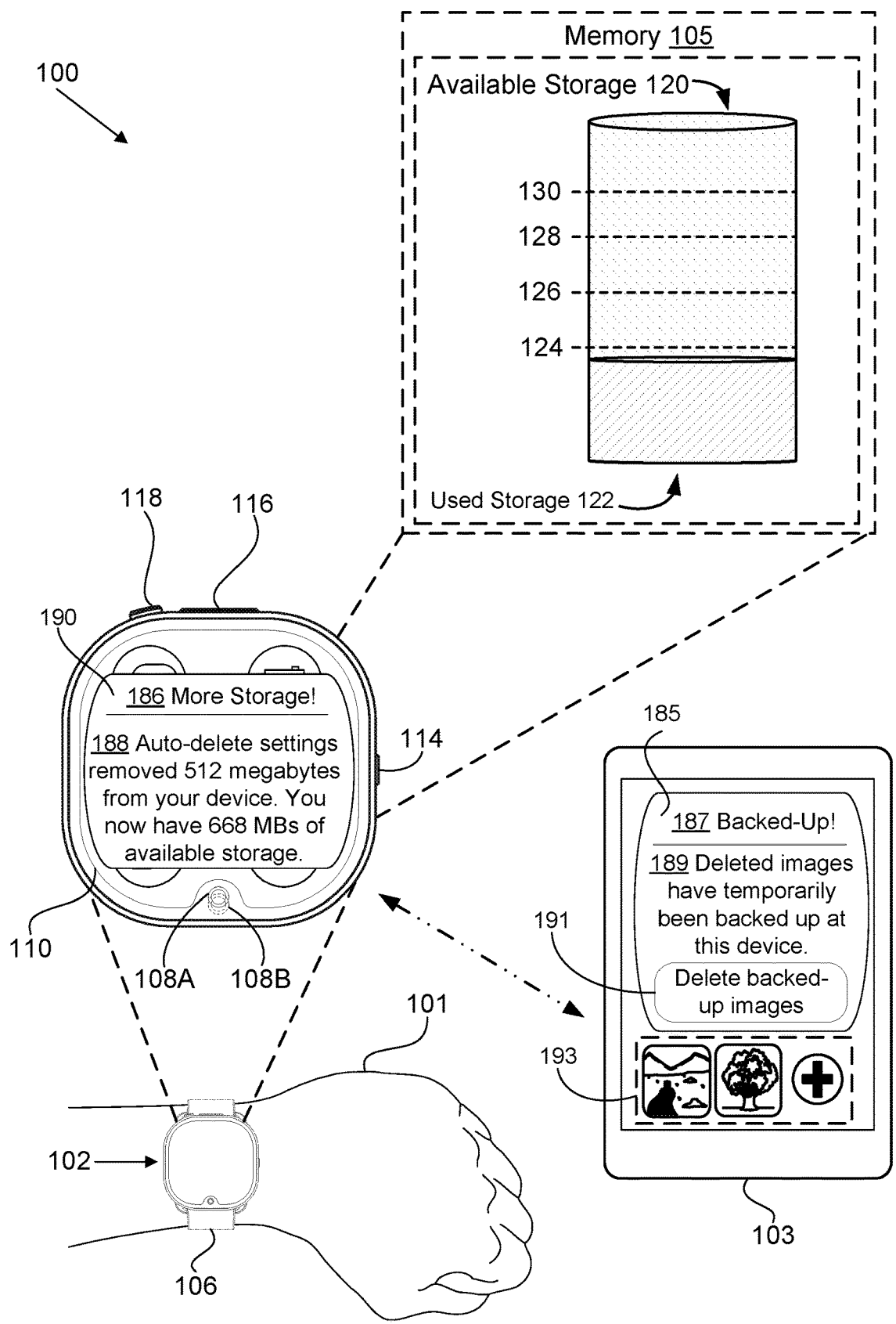

Turning now to FIG. 1J, the wearable device 102 is shown during a state in which it has made determination that the available storage 120 is not less than the critical storage-depletion threshold 130 or any others of the plurality of storage-depletion thresholds (the first storage-depletion threshold 124, the second storage-depletion threshold 126, and/or the third storage-depletion threshold 128; one or more of which can be stored in the storage-depletion thresholds 1420 in the data 1410 of the memory 1400). As shown with reference to FIG. 1I, the second image-management mode is enabled at the wearable device 102 in accordance with the determination that the available storage 120 at the wearable device 102 is less than the critical storage-depletion threshold 130. When the second image-management mode is enabled, images that are not of a predetermined image type are automatically deleted from the wearable device 102. In some embodiments, in conjunction with the deletion operation, a storage-alert user interface 190 is displayed at the display 110 of the wearable device 102 to notify the user 101 that there is a greater amount of storage (e.g., the available storage 120) has increased at the wearable device 102. In some embodiments, the auto-deletion process is iterative, and images located in the trash directory of the wearable device 102 are deleted before other images are subject to auto-deletion (e.g., images that have not been favorited by the user 101).

Figure 1K:
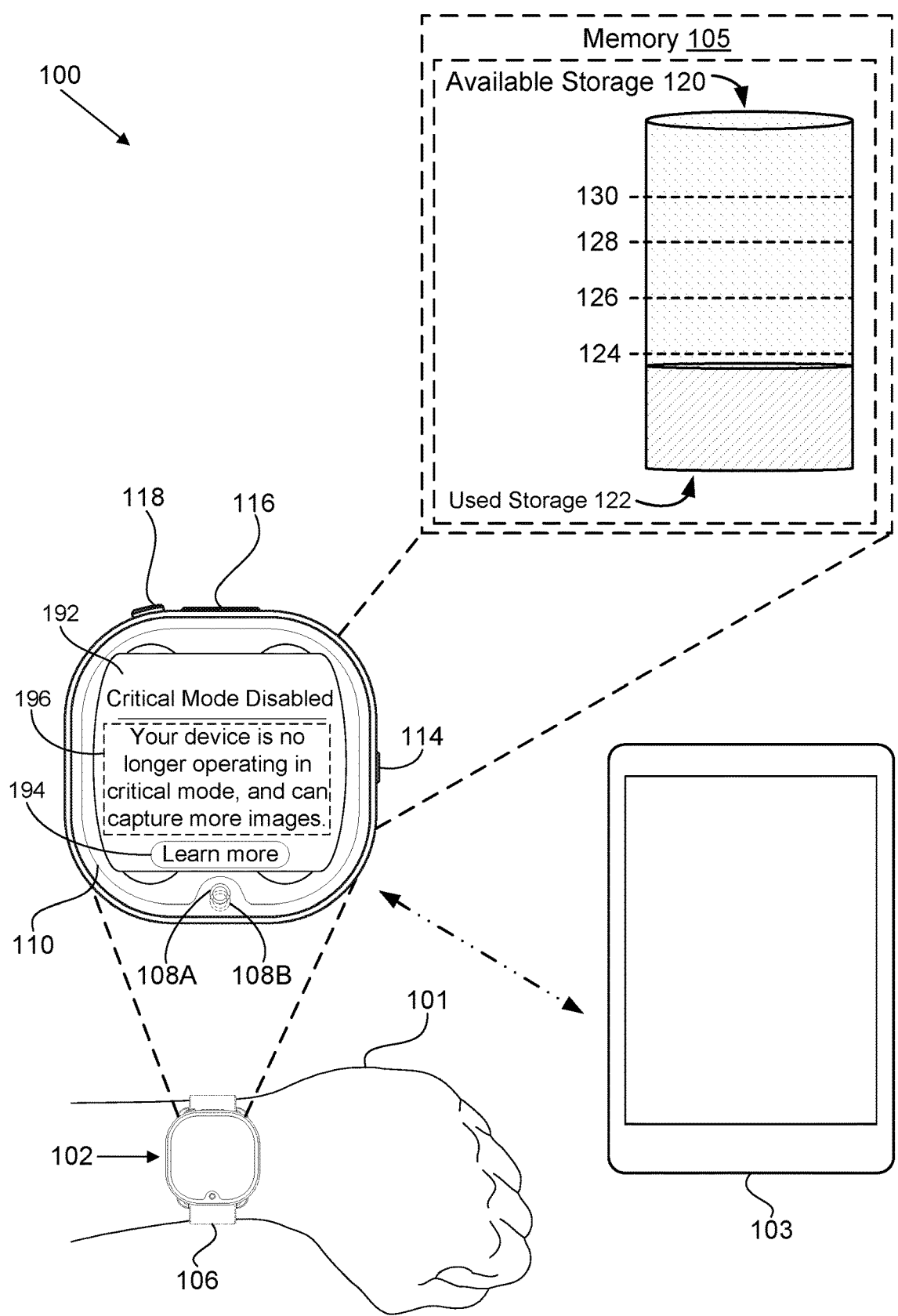

Turning now to FIG. 1K, the wearable device 102 is shown during a state in which it has made determination that the available storage 120 is not less than the first storage-depletion threshold 124 or any other storage-depletion thresholds of the plurality of storage-depletion thresholds. In accordance with the determination, the display 110 of the wearable device 102 displays a user-interface element 192 that indicates to the user that the wearable device 102 is no longer operating in the second image-management mode. The user-interface element 192 includes an affordance 196 that includes information indicating that the wearable device 102 is no longer operating in the second image-management mode. The user-interface element 192 also includes a selectable affordance 194 that the user 101 can select with performance of a user input, including a touch gesture at the display 110 of the wearable device 102. Upon selecting the selectable affordance 194, the additional information can be displayed at the display 110 of the wearable device 102 about the second image-management mode and/or the first image-management mode.

In some embodiments, the determination that the available storage 120 is not less than the first storage-depletion threshold 124, is performed at another electronic device (e.g., the smart phone 103). In some embodiments, when the determination is made that the available storage 120 is less than the first storage-depletion threshold 124, an additional indication is displayed at another electronic device (e.g., the smart phone 103) that is in communication with the wearable device 102. In some embodiments, the additional indication can include an indication that images from the wearable device 102 that have been deleted as a result of turning on auto-deletion at the wearable device 102 have been backed up to the smart phone 103. For example, the smart phone 103 can include a user-interface element 185 that includes an information affordance 189 stating: "The deleted images have temporarily been backed up at this device." In some embodiments, the smart phone 103 includes a selectable affordance 191 that the user 101 can select to delete the images that were deleted from the wearable device 102 as part of the auto-deletion operation performed at the wearable device 102. In some embodiments, the smart phone 103 can also display a gallery 193 that includes images that were deleted from the wearable device 102 as part of the auto-deletion operation, and the user 101 can select one or more of the deleted images to restore to the wearable device 102.

Figure 2A:
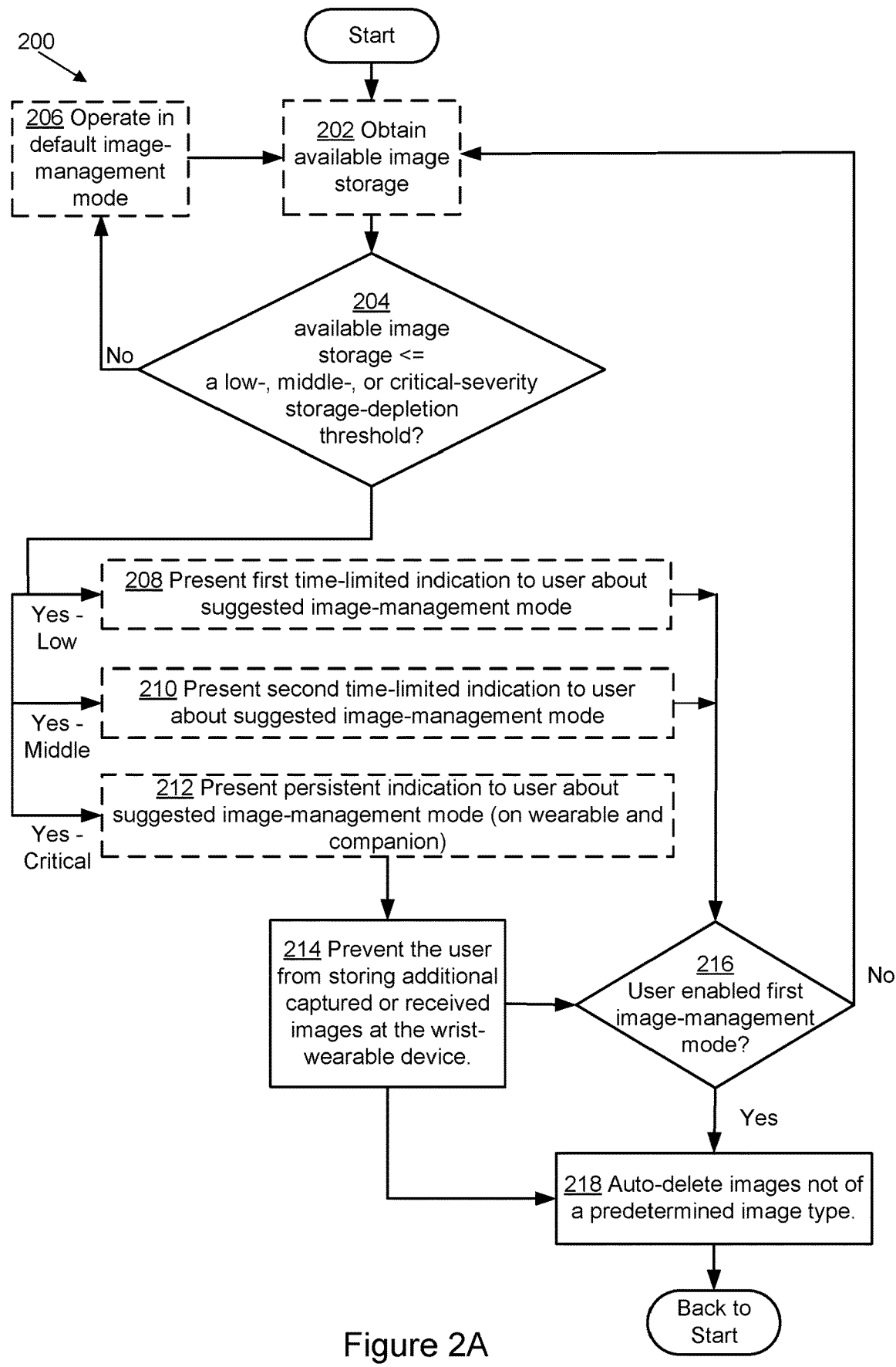
FIGS. 2A-2B depict a flow diagram of a method for storage management is at the wearable device as storage is being depleted and/or made available at the wearable device, in accordance with some embodiments.
Figure 2B:
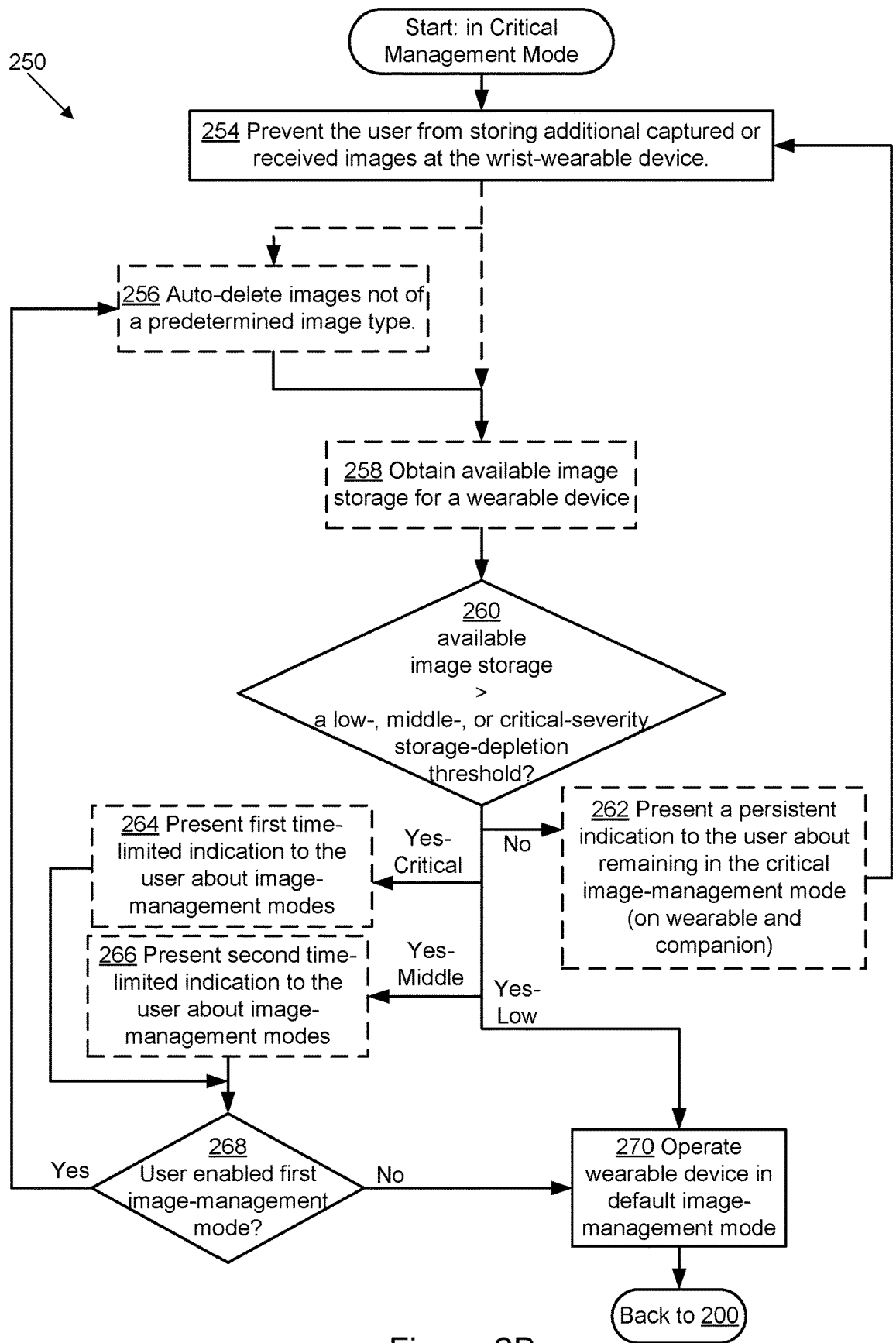

FIGS. 2A-2B depict a flow diagram of a method 200 for storage management, performed at an electronic device (e.g., the wearable device 102 shown in FIG. 1A-1K) as storage is depleted and/or made available at the electronic device, in accordance with some embodiments. Specifically, FIG. 2A depicts a method 200 for storage management, performed at the electronic device (e.g., any of the electronic devices 1002A-1002C illustrated in FIG. 3, individually or in combination) as storage is being depleted (e.g., an image storage 1418 of the data 1410 in memory 1400 in FIG. 3) at the electronic device, in accordance with some embodiments, and FIG. 2B depicts a method 250 for storage management, performed at the electronic device as depleted storage is being made available, in accordance with some embodiments.

Turning now to FIG. 2A, in some embodiments, performance of the method 200 includes obtaining (202) an amount of available image storage at the electronic device (e.g., a wearable device, a head-wearable device, and/or a removable capsule or other component that forms a part of a wearable device system, etc.). In some embodiments, the method 200 uses computing resources of another electronic device (e.g., the processors and/or memory of the smart phone 103 in FIGS. 1A-1K) to obtain information about the first amount of storage at the electronic device. In some embodiments, the first amount of storage corresponds to an amount of available image storage (e.g., available image storage 260 in FIG. 2B; the remaining available storage 120 less the used storage 122 in FIGS. 1A, 1C, and 1E-1H) that is less than a total amount of storage available in memory (e.g., memory 1400 in FIG. 3) of the electronic device.

Figure 3:
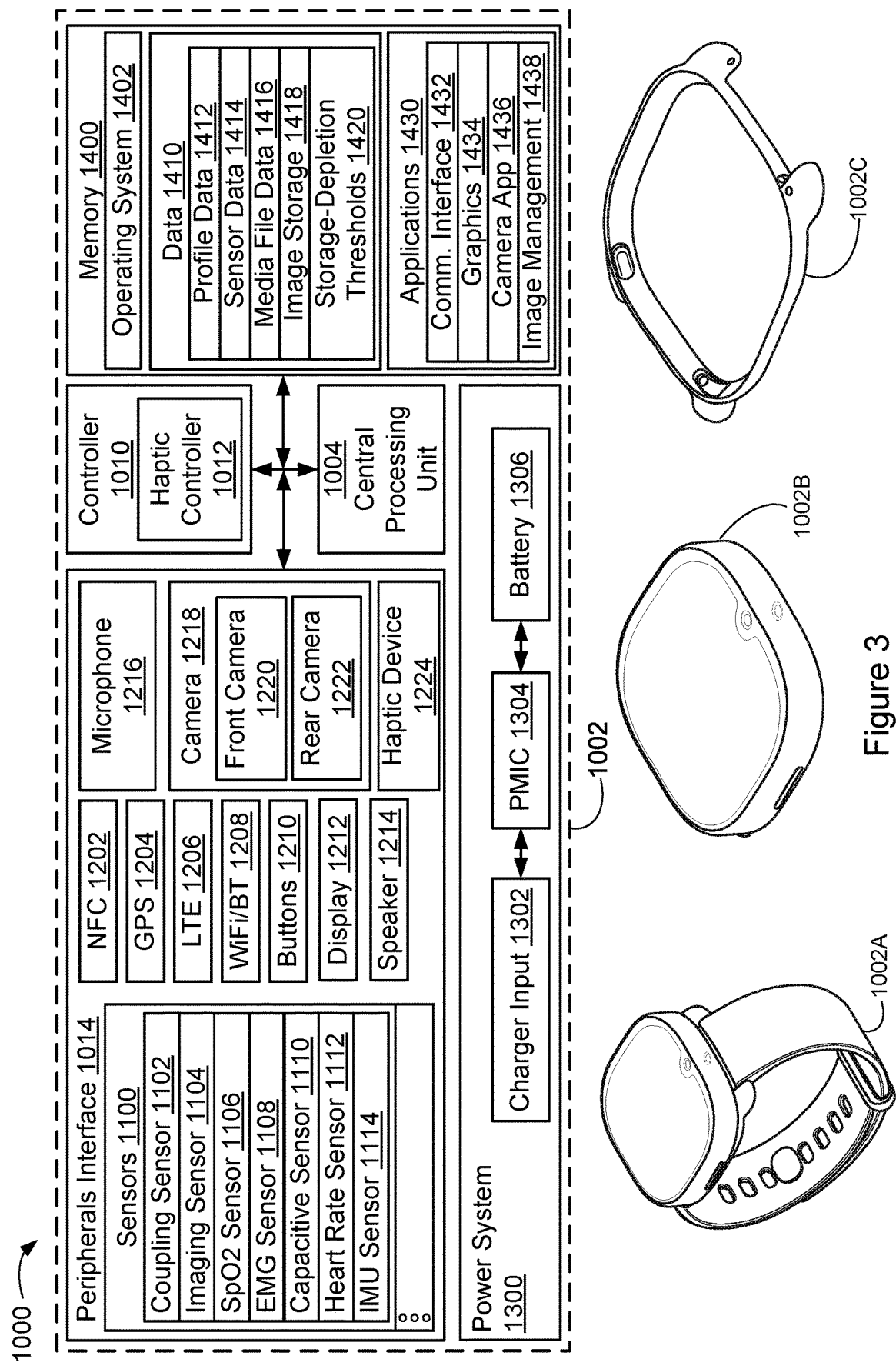
FIG. 3 is a block diagram illustrating a computing system (e.g., a wearable device with capsule, cradle, and band components that are shown at the bottom of FIG. 3) in accordance with some embodiments.

Performance of the method 200 includes determining (204) whether the amount of storage at the electronic device is less than one or more of a plurality of storage-depletion thresholds, including at least two of a low-severity storage-depletion threshold (e.g., the first storage-depletion threshold 124; FIGS. 1A-1K), a middle-severity storage-depletion threshold (e.g., the second storage-depletion threshold 126; FIGS. 1A-1K), and a critical storage-depletion threshold (e.g., critical storage-depletion threshold 130; FIGS. 1A-1K). In some embodiments, there can be additional storage-depletion thresholds between the first storage-depletion threshold and the critical storage-depletion threshold (e.g., the third storage-depletion threshold 128; FIGS. 1A-1K). In some embodiments, performance of the method 200 only causes comparing the amount of available image storage to a non-critical storage-depletion threshold (e.g., a first storage-depletion threshold that can be the low-severity storage-depletion threshold and/or the middle-severity storage-depletion threshold) and a critical storage-depletion threshold (e.g., a second storage-depletion threshold). In some embodiments, the critical storage-depletion threshold can correspond to an amount of available image storage that is equal to zero (e.g., the entirety of the memory 1400, or a specific portion allocated to storage of a type of data such as camera data (which can include various types of images and videos), shown in FIG. 3 is used storage). That is, the critical storage-depletion threshold can be satisfied after a situation in which there is no available image storage, in accordance with some embodiments.

In some embodiments, performance of the method 200 includes operating (206) the electronic device in a default image-management mode in accordance with determining that the amount of available storage at the electronic device is not less than any of the plurality of storage-depletion thresholds (e.g., "No" at operation 204, which can correspond to used storage 122 like that shown in FIG. 1A). In some embodiments, the auto-deletion does not occur at the electronic device while the electronic device is in the default image-management mode.

In some embodiments, in accordance with performance of the method 200 resulting in a determination that the amount of available image storage at the electronic device is less than or equal to a low-severity storage-depletion threshold (204, Yes-Low), the electronic device is caused to present (208) a second time-limited indication to the user about a suggested image-management mode (e.g., affordance 132 in FIG. 1C). In some embodiments, the electronic device is caused to suggest the first image-management mode if the first image-management mode is not already activated at the electronic device, and the electronic device is caused to suggest the second image-management mode if the first image-management mode is already activated at the electronic device.

In some embodiments, in accordance with performance of the method 200 resulting in a determination that the amount of available image storage at the electronic device is less than or equal to a middle-severity storage-depletion threshold (204, Yes-Middle), the electronic device is caused to present (210) a first time-limited indication to the user about a suggested image-management mode. In some embodiments, the electronic device is caused to present information about a plurality of image-management modes, including a first image-management mode and the critical image-management mode.

In some embodiments, in accordance the determination that the amount of available image storage at the electronic device is less than or equal to the critical storage-depletion threshold, performance of the method 200 causes the electronic device to present (212) a persistent indication to the user about suggested image-management modes (e.g., at the electronic device itself, or at another companion device). If the determination is made that the amount of available image storage is less than or equal to the critical storage-depletion threshold, the method 200 causes the electronic device to further prevent 214 the user from storing additional captured or received images at the electronic device.

In some embodiments, in accordance with the performance of the method 200 resulting in the determination that the amount of available storage is less than or equal to the low-severity storage storage-depletion threshold or the mid-severity storage-depletion threshold (e.g., "Yes-Low" or "Yes-Mid" at 204), the electronic device, after or in conjunction with presenting the appropriate indication, also determines (216) whether the user has enabled a first image-management mode at the electronic device.

If the user has enabled the first image-management mode at the electronic device (e.g., "Yes" at 216), the electronic device proceeds to auto-delete (218) images that are not of a predetermined image type from the electronic device while the first image-management mode remains enabled. If the user has not enabled the first image-management mode at the electronic device (e.g., "No" at 216), then the method 200 returns to 202 and again obtains an available amount of image storage from the electronic device and then proceeds to the subsequent operations of the method 200.

Turning now to FIG. 2B, when performance of the method 250 begins, the electronic device is operating in the critical image-management mode (e.g., the second image-management mode). In some embodiments, the critical image-management mode is activated after available image storage is less than or equal to a critical storage-depletion threshold (e.g., after determination 204, Yes-Critical in FIG. 2A).

While the electronic device is operating in the critical image-management mode, the electronic device is forced to prevent (254) the user from storing additional captured or received images at the electronic device (e.g., the electronic device is forcibly moved to operate in the second image-management mode and the user is not given a choice since remaining storage level is critically low). In some embodiments, the electronic device is configured to block the user from storing any additional images at the electronic device until a determination is made that a respective amount of storage remaining at the electronic device is above a respective storage-depletion threshold (determination block 260, FIG. 2B). In some embodiments, the electronic device is configured to block the user from storing any additional images until a determination is made that the electronic device is above a storage-repletion threshold that is greater than or equal to the second storage-depletion threshold.

In some embodiments, in addition to preventing the user from storing any additional images, the method 250 also causes the electronic device to auto-delete (256) images that are not of a predetermined image type.

In some embodiments, after auto-deleting one or more images that are not of the predetermined image type, performance of the method 250 causes the electronic device to obtain (258) an amount of available image storage for the electronic device.

In some embodiments, after obtaining the amount of available image storage at the electronic device, performance of the method 250 causes the electronic device to determine (260) whether the amount of available image storage is greater than one or more storage-depletion thresholds (e.g., a low-severity storage-depletion threshold, a middle-severity storage-depletion threshold, and/or a critical storage-depletion threshold).

In some embodiments, in accordance with performance of the method 250 resulting in a determination that the amount of available image storage at the electronic device is not greater than the critical storage-depletion threshold (or the low- or middle-severity storage-depletion thresholds), performance of the method 250 causes the electronic device to present (262) a persistent indication to the user about the electronic device remaining in the critical image-management mode (e.g., at the electronic device itself, or at another companion device). If the determination is made that the amount of available image storage is not greater than the critical storage-depletion threshold, the method 250 causes the electronic device to return to 254 of the method 250 and causes the electronic device to prevent the user from storing additional captured or received images at the electronic device.

In some embodiments, in accordance with performance of the method 250 resulting in a determination that the amount of available image storage at the electronic device is greater than the critical-severity storage-depletion threshold, but still not greater than the low-severity storage-depletion threshold or the middle-severity storage-depletion threshold, performance of the method 250 causes the electronic device to present (264) a first time-limited indication to the user about image-management modes. In some embodiments, performance of the method 250 causes the electronic device to present information about a plurality of image-management modes, including a first image-management mode (e.g., a non-critical image-management mode) and the critical image-management mode. For example, the electronic device can present an indication that the critical image-management mode has been disabled since the amount of available storage is greater than the critical-severity storage-depletion threshold and can also present an indication suggesting the user to enable the first image-management mode if they have not already enabled the first image-management mode.

In some embodiments, in accordance with performance of the method 250 resulting in a determination that the amount of available image storage at the electronic device is greater than the middle-severity storage-depletion threshold, but still not greater than the low-severity storage-depletion threshold, performance of the method 250 causes the electronic device to present (266) a second time-limited indication to the user about a suggested image-management mode. For example, the electronic device can present an indication that the critical image-management mode is disabled since the amount of available storage is greater than the critical-severity storage-depletion threshold and can also present an indication suggesting the user to enable the first image-management mode if they have not already enabled the first image-management mode. In some embodiments, the electronic device does not present the second time-limited indication that the first image-management mode is available while the user is using one or more applications that cause presentation of the first time-limited indication corresponding to the middle-severity storage-depletion threshold.

In some embodiments, in accordance with performance of the method 250 resulting in a determination that the amount of available image storage at the electronic device is greater than both the low-severity storage-depletion threshold or the mid-severity storage-depletion threshold, performance of the method 250 further includes determining (268) if the user has activated the first image-management mode. In accordance with a determination that the first image-management mode has been enabled at the electronic device (e.g., "Yes" at 268), the method 250 causes the electronic device to return to 256 of the method 250, and further causes the electronic device to auto-delete images that are not of the predetermined image type.

In some embodiments, after determining that the amount of available image storage at the electronic device is less than the critical-severity storage-depletion threshold, the middle-severity storage-depletion threshold, and the low-severity storage-depletion threshold, the electronic device proceeds to operate in the default image-management mode.

Example System-Level Block Diagrams

FIG. 3 is a block diagram of a computing system 1000, according to at least one embodiment of the present disclosure. The computing system 1000 includes an electronic device 1002, which can be, for example, a wearable device. The wearable device 102 described in detail above with respect to FIGS. 1A-1K is an example of the electronic device 1002, so the electronic device 1002 will be understood to include the components shown and described below for the computing system 1000. In some embodiments, all, or a substantial portion of the components of the computing system 1000 are included in a single integrated circuit. In some embodiments, the computing system 1000 can have a split architecture (e.g., a split mechanical architecture, a split electrical architecture) between a watch body (e.g., a watch body 404 in FIG. 4A) and a watch band (e.g., a watch band 406 in FIG. 4A). The electronic device 1002 can include a processor (e.g., a central processing unit 1004), a controller 1010, a peripherals interface 1014 that includes one or more sensors 1100 and various peripheral devices, a power source (e.g., a power system 1300), and memory (e.g., a memory 1400) that includes an operating system (e.g., an operating system 1402), data (e.g., data 1410), and one or more applications (e.g., applications 1430).

In some embodiments, the computing system 1000 includes the power system 1300 which includes a charger input 1302, a power-management integrated circuit (PMIC) 1304, and a battery 1306.

In some embodiments, a watch body and a watch band can each be electronic devices 1002 that each have respective batteries, 1306, and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 1300 to enable each to operate independently. The watch body and watch band can also share power (e.g., one can charge the other) via respective PMICs 1304 that can share power over power and ground conductors and/or over wireless charging antennas.

In some embodiments, the peripherals interface 1014 can include one or more sensors 1100. The sensors 1100 can include a coupling sensor 1102 for detecting when the electronic device 1002 is coupled with another electronic device 1002 (e.g., a watch body can detect when it is coupled to a watch band, and vice versa). The sensors 1100 can include imaging sensors 1104 for collecting imaging data. In some embodiments, the imaging sensors 1104 can be separate from the cameras 1218. In some embodiments the sensors include an SpO2 sensor 1106. In some embodiments, the sensors 1100 include an EMG sensor 1108 for detecting, for example muscular movements by a user of the electronic device 1002. In some embodiments, the sensors 1100 include a capacitive sensor 1110 for detecting changes in potential of a portion of a user's body. In some embodiments, the sensors 1100 include a heart rate sensor 1112. In some embodiments, the sensors 1100 include an inertial measurement unit (IMU) sensor 1114 for detecting, for example, changes in acceleration of the user's hand.

In some embodiments, the peripherals interface 1014 includes a near-field communication (NFC) component 1202, a global positioning system (GPS) component 1204, a long-term evolution (LTE) component 1206, and or a Wi-Fi or Bluetooth communication component 1208.

In some embodiments, the peripherals interface includes one or more buttons (e.g., the buttons 414, 416, and 418 in FIGS. 4A-4B), which, when selected by a user, cause operation to be performed at the electronic device 1002.

The electronic device 1002 can include at least one display 1212, for displaying visual affordances to the user, including user-interface elements and/or three-dimensional virtual objects. The display can also include a touch screen for inputting user inputs, such as touch gestures, swipe gestures, and the like.

The electronic device 1002 can include at least one speaker 1214 and at least one microphone 1216 for providing audio signals to the user and receiving audio input from the user. The user can provide user inputs through the microphone 1216 and can also receive audio output from the speaker 1214 as part of a haptic event provided by the haptic controller 1012.

The electronic device 1002 can include at least one camera 1218, including a front camera 1220 and a rear camera 1222. As described herein, the image-management module 1438 can communicate with the front camera 1220 or the rear camera 1222 based on the current image-management mode that is active at the electronic device 1002. In some embodiments, the electronic device 1002 can be a head-wearable device, and one of the cameras 1218 can be integrated with a lens assembly of the head-wearable device.

One or more of the electronic devices 1002 can include one or more haptic controllers 1012 and associated componentry for providing haptic events at one or more of the electronic devices 1002 (e.g., a vibrating sensation or audio output in response to an event at the electronic device 1002). The haptic controllers 1012 can communicate with one or more electroacoustic devices, including a speaker of the one or more speakers 1214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 1012 can provide haptic events to that are capable of being sensed by a user of the electronic devices 1002. In some embodiments, the one or more haptic controllers 1012 can receive input signals from an application of the applications 1430, including from the image-management module 1438. For example, the image-management module 1438 can provide a signal to the haptic controller 1012 instructing the haptic controller 1012 to provide a haptic event to the user in accordance with a determination that the available image storage 1418 at the electronic device 1002 is less than or equal to one or more storage-depletion thresholds, and/or is greater than or equal to one or more storage repletion thresholds.

Memory 1400 optionally includes high-speed random-access memory and optionally also includes non-volatile memory, such as one or more magnetic disk storage devices, flash memory devices, or other non-volatile solid-state memory devices. Access to the memory 1400 by other components of the electronic device 1002, such as the one or more processors of the central processing unit 1004, and the peripherals interface 1014 is optionally controlled by a memory controller of the controllers 1010.

In some embodiments, software components stored in the memory 1400 can include one or more operating systems 1402 (e.g., a Linux-based operating system, an Android operating system, etc.). The memory 1400 can also include data 1410, including structured data (e.g., SQL databases, MongoDB databases, GraphQL data, JSON data, etc.). The data 1410 can include profile data 1412, sensor data 1414, media file data 1416, and/or available image storage 1418. Operating systems 1402 can include various software components and/or drivers for controlling and managing general system tasks (e.g., memory management, storage device control, power management, etc.), and can facilitate communication between various hardware and software components. In some embodiments, the methods described herein for managing storage at an electronic device 1002 are based on an amount of available image storage 1418 remaining. In some embodiments, the amount of available image storage 1418 is based on how much of the memory 1400 is allocated for use by one or more operating systems 1402 of the electronic device 1002. For the purposes of this application, the available image storage refers to camera data generally, which can include various types of images, including sequences of images (e.g., videos), as well as other types of data that can be collected by certain embodiments of the cameras 1218. In some embodiments, the data 1410 in the memory 1400 includes a data file or other means of logical storage, which includes data values which correspond to storage-depletion thresholds 1420, including storage-depletion thresholds related to the available image storage 1418.

In some embodiments, software components stored in the memory 1400 include one or more applications 1430 configured to be perform operations at the electronic devices 1002. In some embodiments, the one or more applications 1430 include one or more communication interface modules 1432, one or more graphics modules 1434, one or more camera application modules 1436, and/or one or more image-management modules 1438. In some embodiments, a plurality of applications 1430 can work in conjunction with one another to perform various tasks at one or more of the electronic devices 1002. For example, the image-management module 1438 can determine an amount of storage available at the electronic device 1002, and based on the detected amount of storage, can communicate with another electronic device 1002 within the computing system 1000 to sync or "back-up" images between the electronic device 1002 and the other electronic device (e.g., the user-interface element 185 in FIG. 1J indicates that the smart phone 103 has backed-up the deleted images from the wearable device 102), and/or determine which images are deletion-candidates based on settings or other configuration information.

Figure 4A:
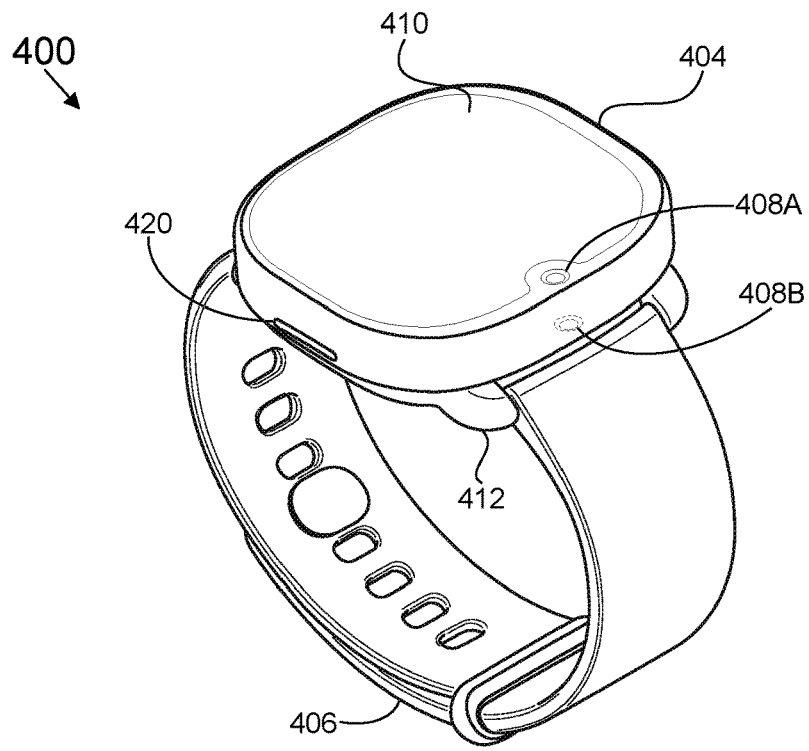
FIGS. 4A-4B illustrate an example of additional views of the wearable device of FIG. 3, in accordance with some embodiments.
Figure 4A:
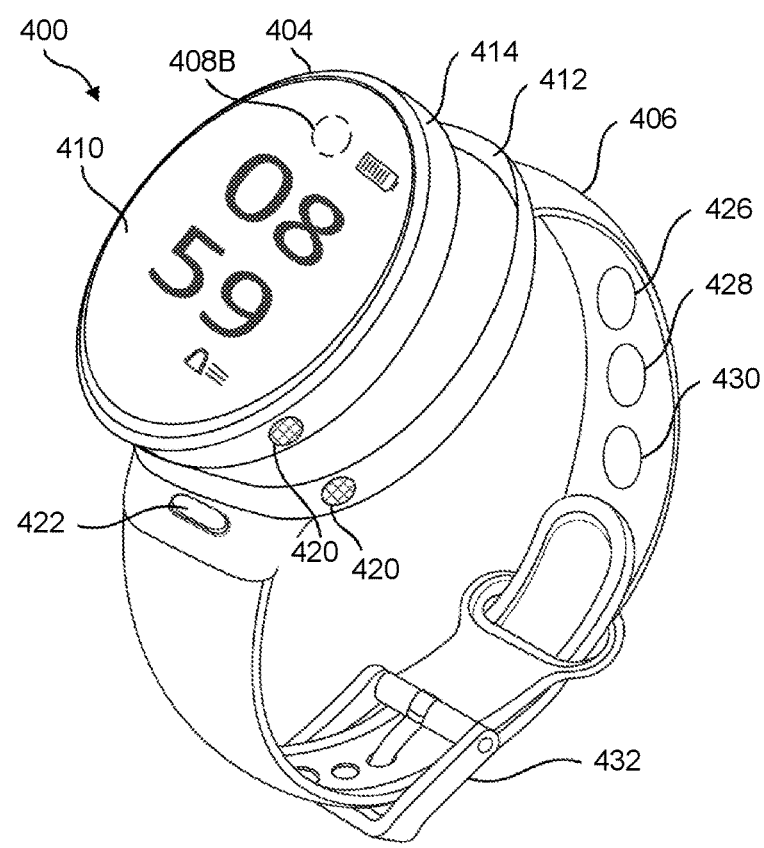

As illustrated by the lower portion of FIG. 3, various individual components of a wearable device (e.g., the wearable device 102 in FIGS. 1A-1K) can be examples of the electronic device 1002. For example, some or all of the components shown in the electronic device 1002 can be housed or otherwise disposed in a combined watch device 1002A, or within individual components of the capsule device watch body 1002B (e.g., the watch body 404; FIG. 4A), the cradle portion 1002C (e.g., the coupling mechanism 412; FIG. 4A), and/or a watch band (e.g., the watch band 406; FIG. 4A).

The electronic devices 1002 are only some examples of the electronic devices 1002 within the computing system 1000, and other electronic devices 1002, including electronic devices that are part of the computing system 1000, can have more or fewer components than shown optionally combines two or more components, or optionally have a different configuration or arrangement of the components. The various components shown in FIG. 3 are implemented in hardware, software, firmware, or a combination thereof, including one or more signal processing and/or application-specific integrated circuits.

Having thus described example block diagrams, attention will now be directed to examples of the wearable devices that can be used in conjunction with the techniques described herein.

Example Wearable Devices (e.g., Wrist-Wearable Devices Such as Smart Watches, and Companion Devices Such as Smart Phones)

Figure 4B:
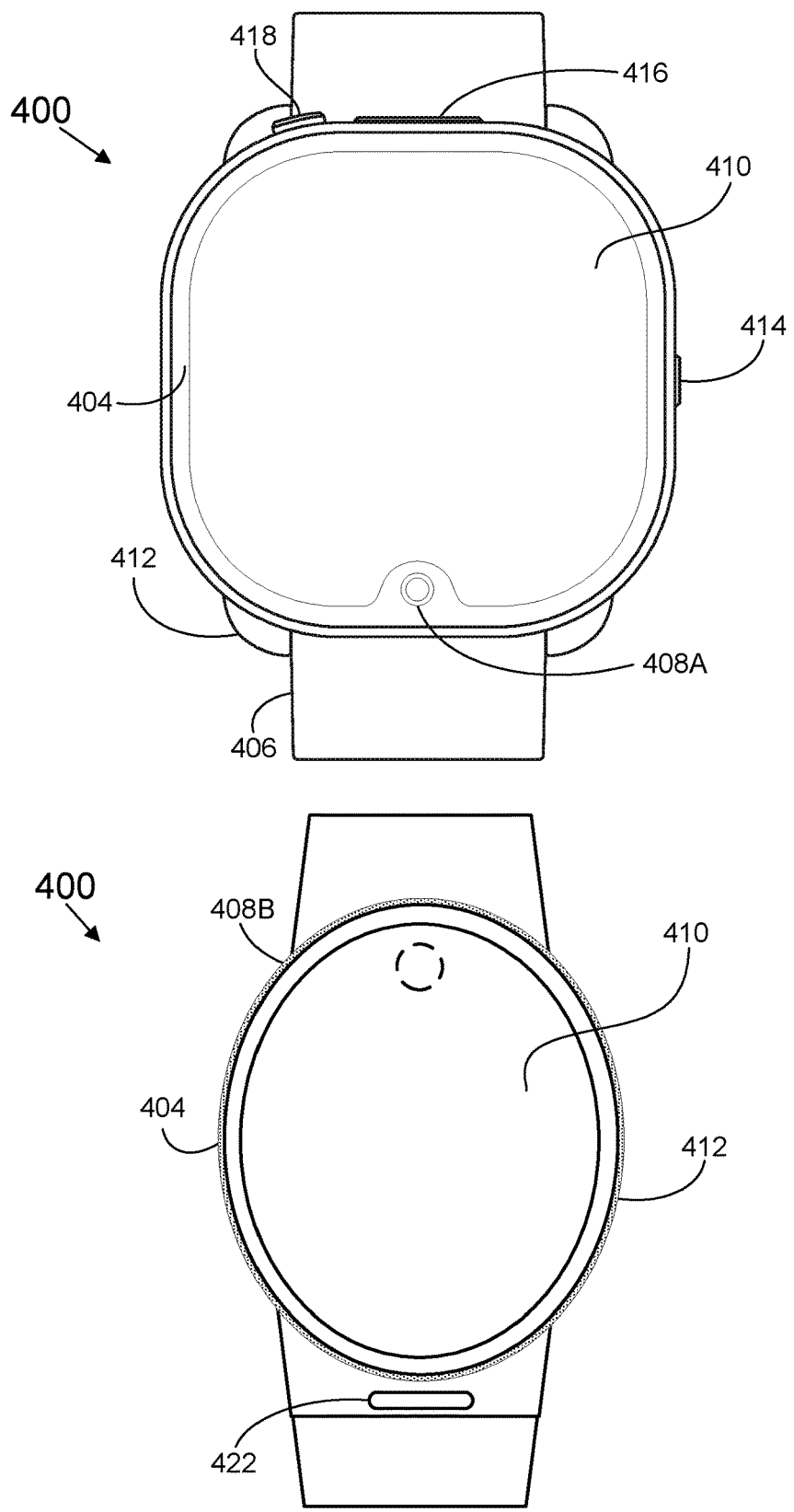

FIGS. 4A and 4B illustrate an example wearable device 400, in accordance with some embodiments. The wearable device 400 is an instance of the electronic device 1002 described above in reference to FIGS. 3, such that the wearable device 400 should be understood to have the features of the electronic device 1002, and vice versa.

FIG. 4A illustrates a perspective view of the wearable device 400 that includes a watch body 404 coupled with a watch band 406. The watch body 404 and the watch band 406 can have a substantially rectangular or circular shape and can be configured to allow a user to wear the wearable device 400 on a body part (e.g., a wrist). The watch body 404 can have a display 410, that can have a substantially rectangular or circular shape that can correspond to the shape of the watch body 404. The display 410 can be touch sensitive, and or can use an imaging sensor (e.g., the front camera 408A) to detect a gesture above the display 410. The wearable device 400 can also include a coupling mechanism 412 (e.g., a cradle) for detachably coupling capsule or watch body 402 (via a coupling surface 422 of the watch body 404) to watch band 406.

The watch band 406 can be configured to be worn by a user such that an inner surface of the watch band 406 is in contact with the user's skin. When worn by a user, a sensor 426 of the wearable device 400 is in contact with the user's skin. The sensor 426 can be a biosensor that senses a user's heart rate, saturated oxygen level, temperature, sweat level, muscle intentions, or a combination thereof. The watch band 406 can include multiple sensors (e.g., sensors 426 and 428) that can be distributed on an inside and/or an outside surface of the watch band 406. Additionally, or alternatively, the watch body 404 can include the same or different sensors than the watch band 406 (or the watch band 406 can include no sensors at all in some embodiments). For example, multiple sensors can be distributed on an inside and/or an outside surface of the watch body 404. The sensors can include any combination of one or more of the sensors including the examples of sensors described with respect to FIG. 3. Watch band 406 can transmit data acquired by one or more sensors to the watch body 404 using a wired communication method (e.g., a UART, a USB transceiver, etc.) and/or a wireless communication method (e.g., near-field communication, Bluetooth, etc.). Watch band 406 can be configured to operate (e.g., to collect sensor data) independent of whether the watch body 404 is coupled to or decoupled from the watch band 406.

In some examples, the watch band 406 can include a neuromuscular-signal sensor 428 (e.g., an electromyography (EMG) sensor, a mechanomyogram (MMG) sensor, a sonomyography (SMG) sensor, etc.). The neuromuscular-signal sensor 428 can sense a user's intention to perform certain motor actions (the sensor 428 can be another example of a sensor used as the biometric sensor in conjunctions with the positional-state determinations described herein). The sensed muscle intention can be used to control certain user interfaces displayed on the display 410 of the wearable device 400 and/or can be transmitted to another device responsible for displaying an artificial-reality environment (e.g., a head-mounted display) to perform an action in an associated artificial-reality environment, such as to control the motion of a virtual device displayed to the user.

Signals from the neuromuscular-signal sensor 428 can be used to provide a user with an enhanced interaction with a physical object and/or a virtual object in an artificial-reality application generated by an artificial-reality system (e.g., user interface objects presented on the display 410, or another computing device (e.g., a head-mounted display)). Signals from neuromuscular-signal sensor 428 can be obtained (e.g., sensed and recorded) by one or more neuromuscular-signal sensors 428 of watch band 406. Although FIG. 4A shows one neuromuscular-signal sensor 428, watch band 406 can include a plurality of neuromuscular-signal sensors 428 arranged circumferentially on an inside surface of watch band 406 such that the plurality of neuromuscular-signal sensors 428 contact the skin of the user. The watch band 406 can include a plurality of neuromuscular-signal sensors 428 arranged circumferentially on an inside surface of watch band 406. Neuromuscular-signal sensor 428 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 406 and/or the watch body 404 can include a haptic device 430 (e.g., a vibratory haptic actuator) that is configured to provide haptic feedback (e.g., a cutaneous and/or kinesthetic sensation, etc.) to the user's skin.

The sensors 426 and 428 and/or the haptic device 430 can be configured to operate in conjunction with multiple applications including, without limitation, health monitoring, social media, game playing, and artificial reality.

The wearable device 400 can include a coupling mechanism (also referred to as a cradle) for detachably coupling the watch body 404 to the watch band 406. A user can detach the watch body 404 from the watch band 406 to reduce the encumbrance of the wearable device 400 to the user. The wearable device 400 can include a coupling mechanism 412 to couple with a coupling surface of the watch body 404 (e.g., a cradle, a tracker band, a support base, a clasp, etc.). A user can perform any type of motion to couple the watch body 404 to the watch band 406 and to decouple the watch body 404 from the watch band 406. For example, a user can twist, slide, turn, push, pull, or rotate the watch body 404 relative to the watch band 406 and to detach the watch body 404 from the watch band 406.

As shown in the example of FIG. 4A, the coupling mechanism 412 can include a type of frame or shell that allows the watch body 404 to be retained within watch band coupling mechanism 412. The watch body 404 can be detachably coupled to the watch band 406 through a friction fit, magnetic coupling, a rotation-based connector, a shear-pin coupler, a retention spring, one or more magnets, a clip, a pin shaft, a hook and loop fastener, or a combination thereof. In some examples, watch body 404 can be decoupled from watch band 406 by actuation of release mechanism 420. The release mechanism 420 can include, without limitation, a button, a knob, a plunger, a handle, a lever, a fastener, a clasp, a dial, a latch, or a combination thereof.

The wearable device 400 can include a single release mechanism 420 or multiple release mechanisms 420 (e.g., two release mechanisms 420 positioned on opposing sides of the wearable device 400 such as spring-loaded buttons). As shown in FIG. 4A, the release mechanism 420 can be positioned on the watch body 404 and/or the coupling mechanism 412. Although FIG. 4A shows release mechanism 420 positioned at a corner of watch body 404 and at a corner of the coupling mechanism 412, the release mechanism 420 can be positioned anywhere on the watch body 404, the watch band 406, and/or the coupling mechanism 412 that is convenient for a user of wearable device 400 to actuate. A user of the wearable device 400 can actuate the release mechanism 420 by pushing, turning, lifting, depressing, shifting, or performing other actions on the release mechanism 420. Actuation of the release mechanism 420 can release (e.g., decouple) the watch body 404 from the coupling mechanism 412 and the watch band 406, allowing the user to use the watch body 404 independently from watch band 406. For example, decoupling the watch body 404 from the watch band 406 can allow the user to capture images using rear camera 408B.

FIG. 4B is a top view of the wearable device 400. The wearable device 400 in FIGS. 4A-4B can include a coupling mechanism 412 (another example of a cradle for the capsule portion of the device, the watch body 404). The watch body 404 can be detachably coupled to the coupling mechanism 412. The watch body 404 can be detachably coupled to the coupling mechanism 412 through a friction fit, magnetic coupling, a rotation-based connector, a shear-pin coupler, a retention spring, one or more magnets, a clip, a pin shaft, a hook and loop fastener, or a combination thereof.

In some examples, watch body 404 can be decoupled from the coupling mechanism 412 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 404, independently in the coupling mechanism 412, and/or in communication between watch body 404 and the coupling mechanism 412. The coupling mechanism 412 can be configured to operate independently (e.g., execute functions independently) from watch body 404. Additionally, or alternatively, the watch body 404 can be configured to operate independently (e.g., execute functions independently) from the coupling mechanism 412. As described above with reference to the block diagram of FIG. 3, the coupling mechanism 412 and/or the watch body 404 can each include the independent resources required to independently execute functions. For example, the coupling mechanism 412 and/or the watch body 404 can each include a power source (e.g., a battery), a memory, data storage, a processor (e.g., a CPU), communications, a light source, and/or input/output devices. As shown in FIGS. 4A-4B, the coupling mechanism 412 can be configured to receive a coupling surface proximate to the bottom side of the watch body 404 (e.g., a side opposite to a front side of the watch body 404 where the display 410 is located), such that a user can push the watch body 404 downward into the coupling mechanism 412 to attach the watch body 404 to the coupling mechanism 412. In some embodiments, the coupling mechanism 412 can be configured to receive a top side of the watch body 404 (e.g., a side proximate to the front side of the watch body 404 where the display 410 is located) is pushed upward into the cradle, as opposed to being pushed downward into the coupling mechanism 412. In some embodiments, the coupling mechanism 412 is an integrated component of the watch band 406 such that the watch band 406 and the coupling mechanism 412 are a single unitary structure.

In this example, the coupling mechanism 412 can include all the electronic components of watch band 406. In additional examples, one or more electronic components can be housed in the coupling mechanism 412 and one or more other electronic components can be housed in portions of watch band 406 away from the coupling mechanism 412.

Having thus described example block diagrams of an example computing system 300, and example wearable device 400 attention will now be directed to a detailed flow diagram illustrating example embodiments, and a detailed listing of example embodiments.

Detailed Flow Diagram

FIG. 5 is a detailed flow diagram illustrating a method 500 for storage management performed at a wearable device (e.g., the wearable device 400 in FIGS. 4A-4B), in accordance with some embodiments.

The method 500 includes, in accordance with (502) a first determination that a first amount of storage is less than or equal to a first storage-depletion threshold, providing an indication, at the wearable device, that a first image-management mode is available, wherein, when the wearable device is operating in the first image-management mode, the wearable device is caused to delete one or more images that are not of a predetermined image type. For example, the wearable device 102 displays the storage-alert user interface 131 in accordance with a determination that the remaining amount of available storage 120 at the wearable device 102 is less than the first storage-depletion threshold 124.

In some embodiments, if the amount of storage is not less than the first storage-depletion threshold, the wearable device operates in a default image-management mode, the default image-management mode configured to be used at the wearable device when greater amount of storage than the first storage-depletion threshold is available at the wearable device. In some embodiments, new images captured at the wearable device are stored locally and are not backed up to another device while the wearable device is operating in the default image-management mode that is distinct from the first and second image-management modes.

In some embodiments, the predetermined protected image type corresponds to one or more images that have been selected as a favorite image by the user of the wearable device. For example, when the user 101 captures the new images 125 and 140 at the wearable device 102 in FIGS. 1B and 1D, the user 101 can provide a user input indicating that the user 101 is selecting the image as favorite image.

In some embodiments, the indication is provided in response to the user opening a first image-related application of a plurality of image-related applications available on the wearable device, and the method 500 further includes, while a current amount of storage at the wearable device remains less than the first storage-depletion threshold, in response to the user opening a second image-related application of the plurality of image-related applications available on the wearable device, displaying the indication, at the wearable device, that the first image-management mode is available such that the indication overlays a portion of content associated with the second image-related application.

In some embodiments, while a current amount storage at the wearable device remains less than a first repletion threshold that is greater than or equal to the first depletion threshold, the method 500 causes display of a secondary indication at a second electronic device, which is in communication with the wearable device, where the secondary indication includes information notifying the user that the first image-management mode is available for the wearable device (e.g., the storage-alert user interface 133 displayed at the smart phone 103 in FIG. 1C).

In some embodiments, the secondary indication includes additional information that is not included in the indication displayed at the wearable device (e.g., the affordance 135 displayed at the smart phone 103 includes different information than is displayed in the corresponding affordance 134 of the wearable device 102).

In some embodiments, the method 500 further includes, in accordance with (504) an intermediate determination that an intermediate amount of storage at the wearable device is less than or equal to an intermediate storage-depletion threshold, the intermediate storage-depletion threshold between the first storage-depletion threshold and the second storage-depletion threshold, providing a new indication, at the wearable device, distinct from the indication provided in accordance with the first determination, that the first image-management mode is available. For example, the user-interface element 146 displays different information (e.g., the affordance 148), which corresponds to the available storage 120 being less than the second storage-depletion threshold 126, than the information displayed in the affordance 132 in the storage-alert user interface 131, which indicates that the available storage 120 at the wearable device 102 is less than the first storage-depletion threshold 124.

In some embodiments, the method 500 further includes, while (506) the wearable device is operating in the first image-management mode, deleting one or more deletion-candidate images from the wearable device that are not of the predetermined protected image type until enough deletion-candidate images have been deleted such that a post-deletion amount of storage remaining at the wearable device is greater than the first storage-depletion threshold. For example, as shown by the storage-alert user interface 190 in FIG. 1J, when the wearable device 102 is caused to auto-delete images, the available storage 120 is greater than the first storage-depletion threshold 124. The user 101 could have optionally caused the same auto-deletion operation to be performed by providing a user input to select the selectable affordance 152 in FIG. 1E.

In some embodiments, while the wearable device is in the first image-management mode, at least one of the one or more deletion-candidate images that are not of a predetermined protected image type, are backed up to another device before deleting the one or more deletion-candidate images. For example, as indicated by the user-interface element 185 in FIG. 1J, the smart phone 103 backs up the images that were deleted through auto-deletion at the wearable device 102.

The method 500 further includes, in accordance with (508) a second determination that an updated amount of storage at the wearable device is less than or equal to a second storage-depletion threshold, the second storage-depletion threshold associated with a smaller amount of storage than the first depletion threshold, automatically, and without a request from a user of the wearable device, operate the wearable device in a second image-management mode (e.g., the affordance 182 in FIG. 1I indicates that the wearable device 102 is operating in a critical image-management mode).

The method 500 further includes, when (510) the wearable device is operating in the second image-management mode, blocking the user from storing any additional images at the wearable device until a repletion determination is made that a respective amount of storage remaining at the wearable device is greater than or equal to the second storage-depletion threshold (e.g., the image 176 is blocked from being saved at the wearable device 102 in FIG. 1I).

In some embodiments, while the wearable device is operating in the second image-management mode, the wearable is caused to display, on the display of the wearable device, a critical indication that the wearable device has been forced to operate in the second image-management mode (e.g., the user-interface element 184 in FIG. 1I). In some embodiments, the critical indication is displayed system-wide on the wearable device for at least a predefined period of time.

In some embodiments, while the updated amount of storage at the wearable device remains less than the second storage-depletion threshold, the method 500 causes another electronic device in communication with the wearable device to present, an additional critical indication, where the additional critical indication indicates that the wearable device has been forced to operate in the second image-management mode (e.g., the smart phone 103 in FIG. 1I).

In some embodiments, the additional critical indication is displayed with an image-deletion option that, when selected, causes the wearable device to delete enough images that are not of the predetermined protected image type until a post-image-deletion amount of storage at the wearable device is greater than the second storage-depletion threshold. For example, FIG. 1J shows the wearable device 102 displaying a storage-alert user interface 190 indicating to the user 101 that auto-deletion settings removed 512 megabytes from the available storage 120 of the wearable device 102.

In some embodiments, at least one of the first determination that the first amount of storage is less than or equal to the first storage-depletion threshold, and the second determination that the updated amount of storage at the wearable device is less than or equal to the second storage-depletion threshold, are performed at another electronic device (e.g., the smart phone 103 in FIGS. 1A-1K). In some embodiments, the other electronic device is a portable computing unit configured to perform computations in conjunction with operation of the wearable device.

In some embodiments, while the method 500 is operating the wearable device in the second image-management mode, the method 500 includes receiving, at the wearable device, a storage request to add a new image to a storage location at the wearable device, and, in response to receiving the request, blocking the user from being able to add the new image to the storage location at the wearable device. In some embodiments, the new image was received within a conversation thread of a messaging application, or the request to add the new image to storage is made in conjunction with capturing an image using a camera of the wearable device. For example, FIG. 1H, the user 101 receives a message at their wearable device and attempts to save the image 176 that was received in the message. In response, as shown in FIG. 1I, the wearable device 102 displays a user-interface element 184 indicating that the user 101 cannot save the image 176 at the wearable device 102.

In some embodiments, while the wearable device is operating in the second image-management mode, based on determining that a post-deletion amount of storage at the wearable device is greater than a repletion threshold greater than or equal to the second depletion threshold, the method 500 ceases to operate the wearable device using the second image-management mode. For example, in FIG. 1K, the wearable device 102 makes a determination (e.g., a repletion determination) that the available storage is not less than the first storage-depletion threshold 124 or any other storage-depletion thresholds, and the wearable device 102 displays a user-interface element 192 that indicates to the user 101 that the wearable device 102 is no longer operating in the second image-management mode.

Example Embodiments

A few example embodiments of the methods and systems described herein will now be briefly described.

(A1) In accordance with some embodiments, a method of optimizing storage of images at a wearable device is disclosed. The method includes, determining a first amount of storage at the wearable device. The method further includes, in accordance with a first determination that the first amount of storage is less than or equal to a first storage-depletion threshold, providing an indication, at the wearable device, that a first image-management mode is available, where, when the wearable device is operating in the first image-management mode, the wearable device is caused to delete one or more images that are not of a predetermined image type. The method further includes, in accordance with a second determination that an updated amount of storage at the wearable device is less than or equal to a second storage-depletion threshold, the second storage-depletion threshold associated with a smaller amount of storage than the first storage-depletion threshold, automatically, and without a request from a user of the wearable device, operating the wearable device in a second image-management mode, where, when the wearable device is operating in the second image-management mode, the wearable device is configured to block the user from storing any additional images at the wearable device until a determination is made that a respective amount of storage remaining at the wearable device is above the second storage-depletion threshold.

(A2) In some embodiments of A1, the method further includes, before the second determination that the updated amount of storage at the wearable device is less than or equal to the second storage-depletion threshold, in accordance with an intermediate determination an intermediate amount of storage at the wearable device is less than or equal to a respective additional storage-depletion threshold, the respective additional storage-depletion threshold between the first storage-depletion threshold and the second storage-depletion threshold, providing a new indication at the wearable device that the first image-management mode is available.

(A3) In some embodiments of A1-A2, the method further includes, while the wearable device is operating in the first image-management mode, deleting one or more deletion-candidate images from the wearable device that are not of the predetermined image type until enough deletion-candidate images have been deleted such that a new amount of storage remaining at the wearable device is greater than the first storage-depletion threshold.

(A4) In some embodiments of A3, the method further includes, while the wearable device is in the first image-management mode, backing up at least one of the one or more deletion-candidate images that are not of a predetermined protected image type to another device before deleting the one or more deletion-candidate images.

(A5) In some embodiments of A1-A4, new images captured at the wearable device are stored locally and are not backed up to another device while the wearable device is operating in a default image-management mode that is distinct from the first and second image-management modes, the default image-management mode configured to be used at the wearable device when more storage greater than the first storage-depletion threshold is available at the wearable device.

(A6) In some embodiments of A1-A5, the predetermined image type is a type of image that has been selected as a favorite image by the user of the wearable device.

(A7) In some embodiments of A1-A6, the method further includes, while storage at the wearable device remains less than the first storage-depletion threshold, causing display of an additional indication at another electronic device, which is in communication with the wearable device, where the additional indication on the display of the other electronic device includes information notifying the user that the first image-management mode is available for the wearable device.

(A8) In some embodiments of A7, the additional indication caused to be displayed at the other electronic device includes additional information that is not included in the indication displayed at the wearable device.

(A9) In some embodiments of A1-A8, at least one of (i) the first determination that the first amount of storage is less than or equal to the first storage-depletion threshold, and (ii) the second determination that the updated amount of storage at the wearable device is less than or equal to the second storage-depletion threshold, are performed at another electronic device that provides information to the wearable device.

(A10) In some embodiments of A1-A9, the indication is provided in response to the user opening a first image-related application of a plurality of image-related applications available on the wearable device, and the method further includes, while a current amount of storage at the wearable device remains less than the first storage-depletion threshold, in response to the user opening a second image-related application of the plurality of image-related applications available on the wearable device, displaying the indication, at the wearable device, that the first image-management mode is available such that the indication overlays a portion of content associated with the second image-related application.

(A11) In some embodiments of A1-A10, the method further includes, while the wearable device is operating in the second image-management mode, displaying, on a display of the wearable device, an additional indication that the wearable device has been forced to operate in the second image-management mode.

(A12) In some embodiments of A11, the critical indication is displayed system-wide on the wearable device for at least a predefined period of time.

(A13) In some embodiments of A11-A12, the method further includes, while the updated amount of storage at the wearable device remains less than the second storage-depletion threshold, causing another electronic device in communication with the wearable device to present, an additional critical indication, where the additional critical indication indicates that the wearable device has been forced to operate in the second image-management mode.

(A14) In some embodiments of A11-A13, the additional indication is displayed with an image-deletion option that, when selected, causes the wearable device to delete enough images that are not of the predetermined image type until a post-image-deletion amount of storage at the wearable device is greater than the second storage-depletion threshold.

(A15) In some embodiments of A1-A14, the method further includes, while operating the wearable device in the second image-management mode, receiving, at the wearable device, a request to add a new image to storage at the wearable device, and in response to receiving the request, blocking the user from being able to add the new image to storage at the wearable device.

(A16) In some embodiments of A15, the new image was received within a conversation thread of a messaging application, or the request to add the new image to storage is made in conjunction with capturing an image using a camera of the wearable device.

(A17) In some embodiments of A1-A16, the method further includes, while the wearable device is operating in the second image-management mode, based on determining that a new amount of storage at the wearable device is greater than the second storage-depletion threshold, ceasing to operate the wearable device using the second image-management mode.

(B1) In some embodiments, a wearable device is provided that is configured to perform or cause performance of the method of any of A1-A17.

(C1) In some embodiments, a capsule device housing the display of the wearable device recited in any of A1-A17 is provided. The capsule device is configured to couple with a band to form a wearable device, and the capsule device includes one or more processors configured to perform or cause performance of the methods of any of A1-A17.

(D1) In some embodiments, a non-transitory computer-readable storage medium is provided that includes instructions that, when executed by a wearable device, causes the wearable device to perform or cause performance of the method of any of A1-A17.

(E1) In some embodiments, an electronic device, other than a wearable device, is provided that is configured to perform or cause performance of the method of any of A1-A17.

(F1) In some embodiments, a non-transitory, computer-readable storage medium is provided that includes instructions that, when executed by an electronic device other than a wearable device, causes the electronic device to perform or cause performance of the method of any of A1-A17.

(G1) In some embodiments, a system is provided that includes a wearable device and a connected electronic device, where either or both of the wearable device and the other electronic device are configured to perform or cause performance of the method of A1-A17.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of optimizing storage of images at a wearable device, the method comprising:
   in accordance with a first determination that a first amount of storage is less than or equal to a first storage-depletion threshold:
       providing an indication, at the wearable device, that a first image-management mode is available, wherein, when the wearable device is operating in the first image-management mode, the wearable device is caused to delete one or more images that are not of a predetermined protected image type;
   while a current amount of storage at the wearable device remains less than a first repletion threshold that is greater than or equal to the first depletion threshold:

causing display of a secondary indication at a second electronic device, which is in communication with the wearable device, wherein the secondary indication includes information indicating that the first image-management mode is available for the wearable device; and in accordance with a second determination that an updated amount of storage at the wearable device is less than or equal to a second storage-depletion threshold, the second storage-depletion threshold associated with a smaller amount of storage than the first storage-depletion threshold:

automatically, and without a request from a user of the wearable device, operating the wearable device in a second image-management mode, wherein when the wearable device is operating in the second image-management mode:

blocking the user from storing any additional images at the wearable device until a repletion determination is made that a respective amount of storage remaining at the wearable device is greater than or equal to the second storage-depletion threshold.

2. The method of claim 1, further comprising:
before the second determination that the updated amount of storage at the wearable device is less than or equal to the second storage-depletion threshold:
in accordance with an intermediate determination that an intermediate amount of storage at the wearable device is less than or equal to an intermediate storage-depletion threshold, the intermediate storage-depletion threshold between the first storage-depletion threshold and the second storage-depletion threshold:
providing a new indication, at the wearable device, distinct from the indication provided in accordance with the first determination, that the first image-management mode is available.

3. The method of claim 1, further comprising:
while the wearable device is operating in the first image-management mode:
deleting one or more deletion-candidate images from the wearable device that are not of the predetermined protected image type until enough deletion-candidate images have been deleted such that a post-deletion amount of storage remaining at the wearable device is greater than the first storage-depletion threshold.

4. The method of claim 3, further comprising:
while the wearable device is in the first image-management mode:
backing up at least one of the one or more deletion-candidate images that are not of the predetermined protected image type to another electronic device before deleting the one or more deletion-candidate images.

5. The method of claim 1, wherein new images captured at the wearable device are stored locally and are not backed up to another electronic device while the wearable device is operating in a default image-management mode that is distinct from the first and second image-management modes.

6. The method of claim 1, wherein the secondary indication includes additional information that is not included in the indication displayed at the wearable device.

7. The method of claim 1, wherein the indication is provided in response to the user opening a first image-related application of a plurality of image-related applications available on the wearable device, and further comprising:

while a current amount of storage at the wearable device remains less than the first storage-depletion threshold:
in response to the user opening a second image-related application of the plurality of image-related applications available on the wearable device, displaying the indication, at the wearable device, that the first image-management mode is available such that the indication overlays a portion of content associated with the second image-related application.

8. The method of claim 1, further comprising:
while the wearable device is operating in the second image-management mode, displaying, on the display of the wearable device, a critical indication that the wearable device has been forced to operate in the second image-management mode.

9. The method of claim 1, further comprising:
while operating the wearable device in the second image-management mode:
receiving, at the wearable device, a storage request to add a new image to a storage location at the wearable device; and
in response to receiving the request, blocking the user from being able to add the new image to the storage location at the wearable device.

10. A wearable device comprising:
a display;
one or more processors; and
memory comprising instructions that, when executed by the wearable device, cause performance of operations for:
in accordance with a first determination that a first amount of storage is less than or equal to a first storage-depletion threshold:
providing an indication, at the wearable device, that a first image-management mode is available, wherein, when the wearable device is operating in the first image-management mode, the wearable device is caused to delete one or more images that are not of a predetermined protected image type;
while a current amount of storage at the wearable device remains less than a first repletion threshold that is greater than or equal to the first depletion threshold:
causing display of a secondary indication at a second electronic device, which is in communication with the wearable device, wherein the secondary indication includes an information indicating that the first image-management mode is available for the wearable device; and
in accordance with a second determination that an updated amount of storage at the wearable device is less than or equal to a second storage-depletion threshold, the second storage-depletion threshold associated with a smaller amount of storage than the first storage-depletion threshold:
automatically, and without a request from a user of the wearable device, operating the wearable device in a second image-management mode, wherein when the wearable device is operating in the second image-management mode:
blocking the user from storing any additional images at the wearable device until a repletion determination is made that a respective amount of storage remaining at the wearable device is greater than or equal to the second storage-depletion threshold.

11. The wearable device of claim 10, wherein the operations further include:
before the second determination that the updated amount of storage at the wearable device is less than or equal to the second storage-depletion threshold:
in accordance with an intermediate determination that an intermediate amount of storage at the wearable device is less than or equal to an intermediate storage-depletion threshold, the intermediate storage-depletion threshold between the first storage-depletion threshold and the second storage-depletion threshold:
providing a new indication, at the wearable device, distinct from the indication provided in accordance with the first determination, that the first image-management mode is available.

12. The wearable device of claim 10, wherein the operations further include:
while the wearable device is operating in the first image-management mode:
deleting one or more deletion-candidate images from the wearable device that are not of the predetermined protected image type until enough deletion-candidate images have been deleted such that a post-deletion amount of storage remaining at the wearable device is greater than the first storage-depletion threshold.

13. The wearable device of claim 12, wherein the operations further include:
while the wearable device is in the first image-management mode:
backing up at least one of the one or more deletion-candidate images that are not of the predetermined protected image type to another electronic device before deleting the one or more deletion-candidate images.

14. The wearable device of claim 10, wherein new images captured at the wearable device are configured to be stored locally and are not configured to be backed up to another electronic device while the wearable device is configured to operate in a default image-management mode that is distinct from the first and second image-management modes.

15. The wearable device of claim 10, wherein the secondary indication includes additional information that is not included in the indication displayed at the wearable device.

16. A non-transitory, computer-readable storage medium including instructions that, when executed by a wearable device, cause the wearable device to perform or cause performance of operations for:
in accordance with a first determination that a first amount of storage is less than or equal to a first storage-depletion threshold:
providing an indication, at the wearable device, that a first image-management mode is available, wherein, when the wearable device is operating in the first image-management mode, the wearable device is caused to delete one or more images that are not of a predetermined protected image type;
while a current amount of storage at the wearable device remains less than a first repletion threshold that is greater than or equal to the first depletion threshold:
causing display of a secondary indication at a second electronic device, which is in communication with the wearable device, wherein the secondary indication includes information indicating that the first image-management mode is available for the wearable device; and
in accordance with a second determination that an updated amount of storage at the wearable device is less than or equal to a second storage-depletion threshold, the second storage-depletion threshold associated with a smaller amount of storage than the first storage-depletion threshold:
automatically, and without a request from a user of the wearable device, operating the wearable device in a second image-management mode, wherein when the wearable device is operating in the second image-management mode:
blocking the user from storing any additional images at the wearable device until a repletion determination is made that a respective amount of storage remaining at the wearable device is greater than or equal to the second storage-depletion threshold.

17. The non-transitory, computer-readable storage medium of claim 16, wherein the operations further include:
before the second determination that the updated amount of storage at the wearable device is less than or equal to the second storage-depletion threshold:
in accordance with an intermediate determination that an intermediate amount of storage at the wearable device is less than or equal to an intermediate storage-depletion threshold, the intermediate storage-depletion threshold between the first storage-depletion threshold and the second storage-depletion threshold:
providing a new indication, at the wearable device, distinct from the indication provided in accordance with the first determination, that the first image-management mode is available.

18. The non-transitory, computer-readable storage medium of claim 16, wherein the operations further include:
while the wearable device is operating in the first image-management mode:
deleting one or more deletion-candidate images from the wearable device that are not of the predetermined protected image type until enough deletion-candidate images have been deleted such that a post-deletion amount of storage remaining at the wearable device is greater than the first storage-depletion threshold.

19. The non-transitory, computer-readable storage medium of claim 18, wherein the operations further include:
while the wearable device is in the first image-management mode:
backing up at least one of the one or more deletion-candidate images that are not of the predetermined protected image type to another electronic device before deleting the one or more deletion-candidate images.

20. The non-transitory, computer-readable storage medium of claim 16, wherein new images captured at the wearable device are configured to be stored locally and are not configured to be backed up to another electronic device while the wearable device is configured to operate in a default image-management mode that is distinct from the first and second image-management modes.

\* \* \* \* \*